United States Patent
Danesh et al.

(10) Patent No.: US 12,463,722 B2
(45) Date of Patent: *Nov. 4, 2025

(54) HIGH SPEED COMMUNICATION

(71) Applicant: TRANSCELESTIAL TECHNOLOGIES PTE LTD, Singapore (SG)

(72) Inventors: Mohammad Danesh, Singapore (SG); Rohit Jha, Singapore (SG)

(73) Assignee: TRANSCELESTIAL TECHNOLOGIES PTE LTD, Singapore (SG)

(*) Notice: Subject to any disclaimer, the term of this patent is extended or adjusted under 35 U.S.C. 154(b) by 244 days.

This patent is subject to a terminal disclaimer.

(21) Appl. No.: 18/174,326

(22) Filed: Feb. 24, 2023

(65) Prior Publication Data

US 2023/0224035 A1 Jul. 13, 2023

Related U.S. Application Data

(63) Continuation of application No. 17/648,298, filed on Jan. 18, 2022, now Pat. No. 11,595,126, which is a
(Continued)

(30) Foreign Application Priority Data

Jun. 14, 2017 (SG) .......................... 10201704878W

(51) Int. Cl.
*H04B 10/00* (2013.01)
*H04B 10/112* (2013.01)
(Continued)

(52) U.S. Cl.
CPC ..... *H04B 10/1123* (2013.01); *H04B 10/1129* (2013.01); *H04B 10/118* (2013.01); *H04B 10/503* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 4,941,726 A 7/1990 Russell
5,777,768 A 7/1998 Korevaar
(Continued)

FOREIGN PATENT DOCUMENTS

CN 105356943 A 2/2016

OTHER PUBLICATIONS

EP Office Action dated Mar. 27, 2023 as received in Application No. 18818103.6.
(Continued)

*Primary Examiner* — Daniel G Dobson
(74) *Attorney, Agent, or Firm* — Maschoff Brennan

(57) ABSTRACT

A system and method for high speed communication are provided. The system comprises a laser-based system for communication, the system comprising: an acquisition module configured to acquire and characterize a plurality of laser beams; a tracking module configured to track the acquired laser beams, the tracking module comprising: a beaconing feedback and beam divergence mechanism configured to control a beam and detect a beam; an adaptive learning unit configured to implement an adaptive learning detection algorithm to identify and track a unique optical signature from at least one of the acquired laser beams; and a pointing module configured to point at least one laser beam towards a target based on the acquired laser beams.

20 Claims, 16 Drawing Sheets

Related U.S. Application Data continuation of application No. 16/607,326, filed as application No. PCT/SG2018/050295 on Jun. 14, 2018, now Pat. No. 11,228,370.

(51) Int. Cl.
*H04B 10/118* (2013.01)
*H04B 10/50* (2013.01)
*H04J 14/00* (2006.01)

(58) Field of Classification Search
CPC .............. H04B 10/1129; H04B 10/114; H04B 10/1141; H04B 10/1143; H04B 10/1149; H04B 10/118
See application file for complete search history.

(56) References Cited

U.S. PATENT DOCUMENTS

| | | | |
|---|---|---|---|
| 6,839,520 | B1 | 1/2005 | Dreischer et al. |
| 6,934,475 | B2 | 8/2005 | Stappaerts |
| 7,224,905 | B2 | 5/2007 | Ruggiero |
| 7,343,099 | B2 | 3/2008 | Wirth et al. |
| 7,437,077 | B2 | 10/2008 | Wirth et al. |
| 7,457,545 | B2 | 11/2008 | Wirth et al. |
| 7,587,141 | B2 | 9/2009 | Fisher et al. |
| 7,609,972 | B2 | 10/2009 | Cunningham et al. |
| 8,116,632 | B2 | 2/2012 | Miniscalco et al. |
| 10,330,459 | B1 | 6/2019 | Matthews |
| 10,635,800 | B2 | 4/2020 | Bakish |
| 2003/0067657 | A1 | 4/2003 | Dimmler et al. |
| 2003/0194238 | A1 | 10/2003 | Yafuso |
| 2007/0031151 | A1* | 2/2007 | Cunningham ..... H04B 10/1123 398/131 |
| 2009/0160856 | A1 | 6/2009 | Hoguet |
| 2009/0202254 | A1 | 8/2009 | Majumdar et al. |
| 2012/0308239 | A1 | 12/2012 | Sheth et al. |
| 2013/0182620 | A1 | 7/2013 | Chaffee et al. |
| 2014/0320346 | A1 | 10/2014 | Caille et al. |
| 2016/0043800 | A1 | 2/2016 | Kingsbury et al. |
| 2016/0112124 | A1 | 4/2016 | Juarez et al. |
| 2017/0299702 | A9 | 10/2017 | Tidwell |
| 2019/0200977 | A1 | 7/2019 | Shelton et al. |
| 2021/0067248 | A1 | 3/2021 | Nykolak et al. |
| 2022/0345221 | A1* | 10/2022 | Mitchell ............ H04B 10/1121 |

OTHER PUBLICATIONS

EP Office Action dated Sep. 26, 2023 as received in Application No. 18818103.6.

Bilal Ahmad Alvi et al. "Fast Steering Mirror Control Using Embedded Self-Learning Fuzzy Controller for Free Space Optical Communication" Wireless Personal Communications, vol. 76, Issue 3, Mar. 29, 2014, pp. 643-656.

Cao Yang et al., Suppression research of arrival angel for free space optical communication, Seventh International Symposium on Precision Engineering Measurements and Instrumentation, SPIE, Bellingham, WA, vol. 8321, No. 1, Dec. 1, 2011, pp. 1-5.

Shenmin Song et al. Adaptive Wavelet Network Friction Compensation of Inter-Satellite Optical Communication Coarse Pointing Subsystem, Intelligent Control and Automation, 2006 vol. 1, Jun. 2006, pp. 2768-2772.

International Search Report and Written Opinion in PCT/SG2018/050295 mailed Aug. 15, 2018.

Extended European Search Report issued in corresponding application No. 18818103.6, dated Feb. 11, 2021.

Chinese Office Action issued in corresponding application No. 201880039813.8, dated May 18, 2022.

Chinese Office Action issued in corresponding application No. 201880039813.8, dated Oct. 8, 2022.

European Office Action issued in corresponding application No. 18818103.6, dated Oct. 11, 2022.

* cited by examiner

1500

HIGH SPEED COMMUNICATION

CROSS-REFERENCE TO RELATED APPLICATIONS

This application is a continuation of U.S. patent application Ser. No. 17/648,298, filed Jan. 18, 2022, titled HIGH SPEED COMMUNICATION, which is a continuation of U.S. patent application Ser. No. 16/607,326, filed Oct. 22, 2019, now U.S. Pat. No. 11,228,370, issued Jan. 18, 2022, titled HIGH SPEED COMMUNICATION, which is a 371 National Stage of PCT/SG2018/050295, filed Jun. 14, 2018, titled SYSTEM AND METHOD FOR HIGH SPEED COMMUNICATION, which claims priority to Singapore Application No. 10201704878 W, filed Jun. 14, 2017, titled SYSTEM AND METHOD FOR HIGH SPEED COMMUNICATION, all of which are incorporated herein by reference in their entireties.

FIELD OF INVENTION

The present invention relates broadly, but not exclusively, to systems and methods for high speed communication.

BACKGROUND

The problems faced by current satellite technology include having low data transmission rates, a congested Radio Frequency (RF) spectrum and high energy wastage due to wide beam propagation. The transmission spectrum for current satellite technology is also generally restricted to X-band, i.e. frequency in the microwave radio region of the electromagnetic spectrum, and K-band, i.e. the radio spectrum in the microwave range of frequencies. The typical range of frequencies of the X-band and K-band is approximately between 8 and 40 GigaHertz (GHz). Such a range limits data transmission to an average of approximately 1 to 5 Megabits per second (Mbits/sec) for nano satellites and approximately 200 to 300 Mbits/sec for big satellites. Further, allocating further spectrum is also expensive and highly regulated because of core issues within RF technology as RF may not be a sustainable and scalable solution for long term commercial space usage.

As a result, the current commercial space industry and its inter-related industries are experiencing slow growth. With technology improvements in hardware components and software, there are plenty of opportunities in the near-Earth and deep-space industry but such opportunities are suppressed by the current RF infrastructure which is unable to support such a growth.

Further, the satellite market had revenues of over $200 billion in 2015 in which communications satellites represented 42% of the total revenues. In the last few years there have been a few major changes that are reshaping space and satellite industry and in result driving future growth in space communications. Recent advancements in technology has led to a vast range of new commercial space applications but the pace to adapt and utilize the current advancement is slow.

In particular, advances in information technology of both hardware and software are driving the capability to collect and process extremely larger amounts of data that provide new intelligent functionalities particularly in remote sensing applications, such as earth observation. However, there is a bottleneck in these applications as there is a need for more high bandwidth communication channels. Revenues of earth observation services had grown 9% in 2015 and are continuing to grow presently. This has created a major need for high bandwidth communication channels. For example, in applications such as high resolution hyper spectral earth observation the amount of data that needs to be collected has increased by at least one to two orders of magnitude, whereas the communication technology has not scaled at all with the same rate during this time, making relaying this information back to earth very expensive or in some cases unpractical, creating a major bottleneck for new applications.

Further, increased reliance of systems and components on real-time live data connections in the recent years has been driving needs for mobility connections in places which infrastructure is not available, such as offshore maritime applications, in air for aerospace applications and in remote areas. For example, Mobile satellite data revenues grew 27% in 2014-2015, compared to 5% in 2013-2014. Multi 10 Gigabits per second optical transceivers are available at fractions of prices of what they were available initially, allowing non-fiber based photonic applications to leverage on decades of reliable technology maturation.

There has also been a huge amount of growth in the last few years in nanosatellite and microsatellite technology. The average number of satellites launched per year in 2011-2015 increased 36% over previous 5 years. In 2015 alone over 50 percent of the 202 satellites launched were Nanosatellites. One of the current main driving factors in the space industry is the decrease in costs of space launches through improvements in technology and sharing of launch vehicles. The above-mentioned factors together with the maturation and combining of advanced technologies such as Silicon photonics, Microelectromechanical systems MEMS, Nanoelectromechanical systems NEMS, complementary metal-oxide semiconductor CMOS sensors, Nanosatellite technology and launches, are factors driving costs and performance to become competitive to cable and fiber in terms of speed and price. The substantial reduction in cost per unit of throughput, the growing demand and customer confidence due to successful high throughput satellite experiences and the huge need for higher bandwidth are key drivers pushing the need for growth in the high speed communications market.

A need therefore exists to provide systems and methods for high speed communication in current satellite technology that addresses one or more of the above problems. There is also a need to progress the current satellite communications technology, which may seek to capture new markets such as those in telecommunications, Aerospace and Defense, Satellite communications and Financial Markets.

Furthermore, other desirable features and characteristics will become apparent from the subsequent detailed description and the appended claims, taken in conjunction with the accompanying drawings and this background of the disclosure.

SUMMARY

According to a first aspect of the present invention, there is provided a laser-based system for communication, the system comprising: an acquisition module configured to acquire and characterize a plurality of laser beams; a tracking module configured to track the acquired laser beams, the tracking module comprising: a beaconing feedback and beam divergence mechanism configured to control a beam and detect a beam; an adaptive learning unit configured to implement an adaptive learning detection algorithm to identify and track a unique optical signature from at least one of the acquired laser beams; and a pointing module configured to point at least one laser beam towards a target based on the acquired laser beams.

In an embodiment, the acquisition module may comprise: a fiber optic coupling mechanism to couple the acquired laser beams to a fiber system; and a laser beam characterization unit configured to extract specific information from the at least one of the acquired laser beams.

In an embodiment, the tracking module comprises a site diversity unit configured to select at least one of the acquired laser beams based on at least one of: a reliability of the beam, a capacity of the beam, spatial characteristics of the beam and/or temporal characteristics of the beam.

In an embodiment, the laser beam characterization unit comprises an interferometric and compute system configured to extract the specific information.

In an embodiment, the specific information comprises at least one of a temporal identifier, a spatial identifier and/or a spectral identifier.

In an embodiment, the fiber optic coupling mechanism comprises a tapered fiber optic coupler configured to increase a surface size of a fiber core.

In an embodiment, the pointing module comprises a multi-stage beam steering unit configured to steer at least one laser beam towards a target based on the acquired laser beams.

In an embodiment, the multi-stage beam steering unit is configured to change one or more optical properties thereof in order to steer at least one laser beam towards a target based on the acquired laser beams.

In an embodiment, changing the optical properties of the multi-stage beam steering unit comprises one or more of the following steps: inducing a Pockels effect on the beam by applying an electric field; tuning Spatial Light Modulators; tuning a metamaterial structure; inducing a diffraction grating; and modifying an output angle of the beam.

In an embodiment, the beaconing feedback and beam divergence mechanism is configured to execute the following steps, in no particular order, to detect the beam: receive a command to connect to a node; check if a transmitted power is higher than a threshold value; calculate a position vector relative to the node; calculate a spatial uncertainty function based on the position vector; and adjust a beam divergence in relation to the spatial uncertainty.

In an embodiment, adjusting the beam divergence comprises covering a region of uncertainty such that $\theta > \alpha \times \sigma_{max}$, wherein $\theta$ comprises an applied beam divergence, $\alpha$ comprises a diffraction limited beam divergence and $\sigma_{max}$ comprises an uncertainty factor.

In an embodiment, selecting at least one of the acquired laser beams comprises the following steps, in no particular order: identifying a plurality of beacon signals; comparing information received from the beacon signals to an array of information profiles; removing false targets from the plurality of beacon signals; determining and selecting an optimal beacon signal from the plurality of beacon signals; and sending a processed data array to the adaptive learning detection algorithm after the removal of the false targets.

In an embodiment, the adaptive learning detection algorithm is further configured to remove the false targets.

In an embodiment, the adaptive learning unit comprises an adaptive neural network configured to extract a relative location of a beacon at a sub-pixel resolution.

In an embodiment, the step of inducing the diffraction grating is caused by at least one of an acoustic wave and/or a holographic material.

According to a second aspect of the present invention, there is provided a method for communication by a laser-based system, the method comprising: acquiring and characterizing, by an acquisition module, a plurality of laser beams; tracking, by a tracking module, the acquired laser beams; controlling, by a beaconing feedback and beam divergence mechanism, a beam and detecting a beam; implementing, by an adaptive learning unit, an adaptive learning detection algorithm to identify and track a unique optical signature from at least one of the acquired laser beams; and pointing, by a pointing module, at least one laser beam towards a target based on the acquired laser beams.

In an embodiment, the method may further comprise: coupling, by a fiber optic coupling mechanism, the acquired laser beams to a fiber system; and extracting, by a laser beam characterization unit, specific information from the at least one of the acquired laser beams.

In an embodiment, the method may further comprise selecting, by a site diversity unit, at least one of the acquired laser beams based on at least one of: a reliability of the beam, a capacity of the beam, spatial characteristics of the beam and/or temporal characteristics of the beam.

In an embodiment, the method may further comprise extracting, by an interferometric and compute system, the specific information.

In an embodiment, the method may further comprise increasing, by a tapered fiber optic coupler, a surface size of a fiber core.

In an embodiment, the method may further comprise steering, by a multi-stage beam steering unit, at least one laser beam towards a target based on the acquired laser beams.

In an embodiment, the method further comprises changing one or more optical properties of the multi-stage beam steering unit in order to steer at least one laser beam towards a target based on the acquired laser beams.

In an embodiment, the step of changing the optical properties of the multi-stage beam steering unit comprises: inducing a Pockels effect on the beam by applying an electric field; tuning Spatial Light Modulators; tuning a metamaterial structure; inducing a diffraction grating; and modifying an output angle of the beam.

In an embodiment, the step of detecting the beam comprises: receiving a command to connect to a node; checking if a transmitted power is higher than a threshold value; calculating a position vector relative to the node; calculating a spatial uncertainty function based on the position vector; and adjusting a beam divergence in relation to the spatial uncertainty.

In an embodiment, the step of adjusting the beam divergence comprises covering a region of uncertainty such that $\theta > \alpha \times \sigma_{max}$, wherein $\theta$ comprises an applied beam divergence, $\alpha$ comprises a diffraction limited beam divergence and $\alpha_{max}$, comprises an uncertainty factor.

In an embodiment, the step of selecting at least one of the acquired laser beams comprises: identifying a plurality of beacon signals; comparing information received from the beacon signals to an array of information profiles; removing false targets from the plurality of beacon signals; determining and selecting an optimal beacon signal from the plurality of beacon signals; and sending a processed data array to the adaptive learning detection algorithm after the removal of the false targets.

In an embodiment, the method further comprises removing, by the adaptive learning detection algorithm, the false targets.

In an embodiment, the method further comprises extracting, by an adaptive neural network, a relative location of a beacon at a sub-pixel resolution.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 4b shows schematic diagrams illustrating different embodiments of the non-mechanical fine tuning executed by the pointing module of FIG. 4a.

DETAILED DESCRIPTION

Embodiments of the invention disclose an optical-based apparatus that may allow a static or kinetic system of nodes to accurately find, point and align to each other while actively tracking and maintaining alignment. Embodiments of the invention may provide an optimized, efficient method that may allow maximum energy & data transfer in the least possible time, between a plurality of nodes while taking into account random fluctuations or disturbances that may occur on the plurality of nodes themselves or in a medium containing the plurality of nodes and in between them such as atmospheric effects or jitter on the plurality of nodes themselves.

Embodiments of the invention may also disclose the following: a Pointing and Beam Steering System consisting of a multistage beam steering mechanism with a non-mechanical fine tuning system; a Free Space to Fiber Photonic Coupling Waveguide; a Two Way Laser Based Reconfigurable Closed Loop Beaconing Feedback System consisting of: a) an adaptive beacon beam divergence adjustment mechanism and b) a method for Beacon Detection Using Beam Spatial, Temporal and Spectral Data; a Dynamic Site Diversity Using Real-Time Multi-Input, Multi-Output (MIMO) Beam Detection and Channel Quality Sensing; a method for Deep Learning Based Acquisition; a Tracking and Sub Pixel Resolution Detection Algorithm; a method for Interferometric Analysis for Extracting Beam Characterisation from a Beacon Signal; and an Integrated Space and Atmospheric Photonic Simulation Testbed.

Embodiments of the claimed invention may be applied to several industries, such as Aerospace, Clean and Sustainable Technology; Electronics; Engineering and Manufacturing; Info-communication Technologies; Mechanical Engineering; Mining, Oil and Gas industry; Plant and Agricultural industry; Telecommunications industry; Financial Trading; and Defense industry.

Figure 1:
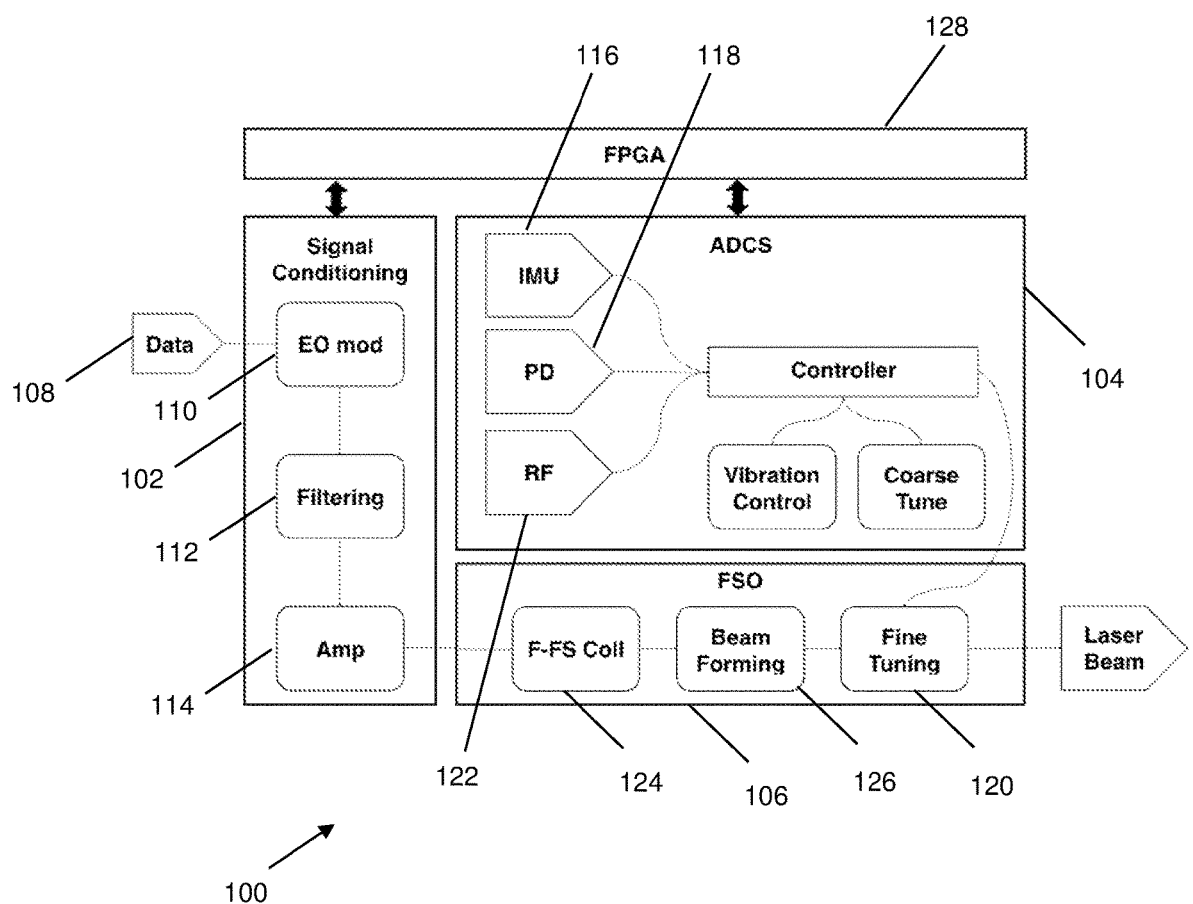
FIG. 1 shows a block diagram of a system 100 for high speed communication, according to an example embodiment.

FIG. 1 shows a block diagram of a system 100 for high speed communication, according to an example embodiment. The system 100 includes a signal conditioning module 102, an attitude detection and control module (ADCS) 104 and a free space optics (FSO) module 106. The signal conditioning module 102 may include a laser source (or data 108 as shown in FIG. 1) coupled with an active temperature control unit configured to provide a thermal stability of an output laser signal. An output laser beam may be modulated through an Electro-Optic (EO) modulation scheme 110 which may be connected via an in-built microwave circuitry to a plurality of data interfacing units (not shown in the Figure). The EO modulation scheme 110 may be configured to optimize power efficiency while the output signal (or output laser beam) may be transmitted to the free space optics (FSO) module 106 via a filtering unit 112 and a final amplification unit 114 to achieve the required output power.

Current satellites typically have their own ADCS module but most of these current systems do not meet the stringent requirements necessary for a high throughput and low SWAP (Size Weight and Power consumption) laser communication system. The ADCS module 104 of the current invention may include specifically developed algorithms that may enable this capability, i.e. a high throughput and low SWAP laser communication system, as described below.

The ADCS module 104 may first detect an exact attitude and position of the satellite via at least four detection signals. The ADCS module 104 may include an in-built high grade Inertial Measurement Chip (IMU) 116. The ADCS module 104 may be configured to provide initial data required for a course tracking unit to point a satellite towards a target ground station. Subsequently, an on-board Quadrature Photodiode and Focal Plane Array 118 in the ADCS module 104 may be configured to receive a laser guiding signal from the target ground station. In another embodiment, an optical signal detector (such as a camera chip) in the ADCS module 104 may be also be configured to receive a laser guiding signal from the target ground station. A fine-tuning correction vector of the ADCS module 104 may be configured to use this data to calculate and feed a final signal to a fine beam steering unit 120. The ADCS module 104 may also include a backup low rate Radio Frequency (RF) signal 122 configured for emergency command and control operations. Alternatively, a complementary hybrid signal solution having maximal power ratio combining or other forms of hybrid solutions may be also be configured for emergency command and control operations.

Embodiments of the present invention may include a plurality of algorithms in the system 100 which may include, but not limited to: 1) a plurality of customized Heuristic Centroiding Algorithms coupled with Adaptive Learning Neural Networks that may be configured to enable sub-pixel resolution. The plurality of customized algorithms may be configured to provide feedback in a closed loop laser adaptive beaconing control system; 2) a method for beam correction using a plurality of software and hardware adaptive optics algorithms; and 3) a plurality of adaptive positioning and predictive course tracking algorithms.

The Free space optics module 106 may be configured to receive the output signal (or output laser beam) from the signal conditioning module 102 and may be configured to transmit the output signal into a diffraction limited precision aligned collimating unit 124. The collimated beam may be transmitted to a beam compensation unit 126 that may be configured to correct atmospheric effects using information gathered through the ADCS module 104 and finally be transmitted to the fine beam steering unit 120, which may be configured to receive a plurality of data corrections vectors from the ADCS module 104. The final beam corrected laser-communications link will be transmitted from the fine beam steering unit 120 to a plurality of ground stations. The Free Space Optics module 106 may also be configured to receive a plurality of incoming beams and transmit them to a communications acquisition unit via an adaptive optics unit (not shown in the Figures).

The system 100 may also include a field-programmable gate array (FPGA) 128 and a plurality of existing astronomical observatory networks such that an optic output from the telescopes of the existing astronomical observatory networks may be retrofitted with the base station equipment as described above. This may be beneficial because (a) there are approximately fifteen Instant Ground station network across the globe which can provide complete coverage; and (b) there may be little wastage of time, money and effort in choosing the appropriate site, leasing land and building a new telescope.

Figure 2:
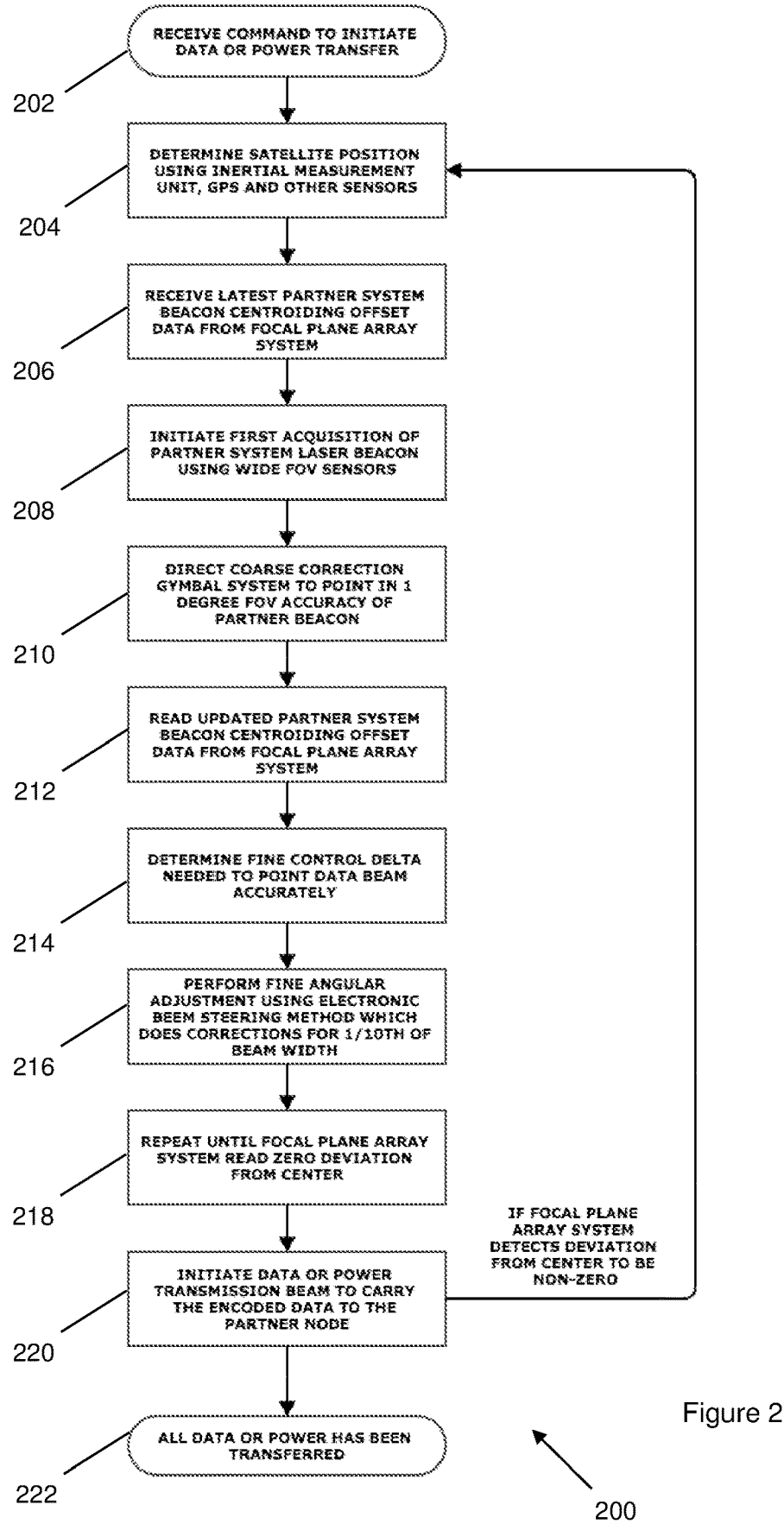
FIG. 2 shows a flow chart illustrating a method 200 for high speed communication, according to an example embodiment.

FIG. 2 shows a flow chart illustrating a method 200 for high speed communication, according to an example embodiment. At step 202, the method includes receiving a command to initiate data or power transfer. At step 204, the method includes determining a satellite position using an inertial measurement unit, a global positioning system (GPS) and other sensors. At step 206, the method includes receiving an updated partner system beacon centroiding offset data from a focal plane array system. At step 208, the method includes initiating a first acquisition of partner system laser beacon using a plurality of wide field-of-view (FOV) sensors. At step 210, the method includes directing a coarse correction gimbal system to point in one degree field-of-view (FOV) accuracy of the partner beacon. At step 212, the method includes reading the updated partner system centroiding set data from the focal plane array system. At step 214, the method includes determining if a fine control delta is required to point the data beam accurately. At step 216, the method includes performing a fine angular adjustment using an mechanical or non-mechanical beam-steering method that corrects for a tenth of the beam width or smaller or larger steps. At step 218, the method includes repeating the above steps until the focal plane array system determines there is zero deviation from the center of the data beam. In other words, if the focal plane array system determines there is non-zero deviation from the center, steps 204 to 216 are repeated. At step 220, the method includes initiating a data or power transmission beam to carry encoded data to the partner node. At step 222, the method includes determining that all data or power has been transferred.

Figure 3:
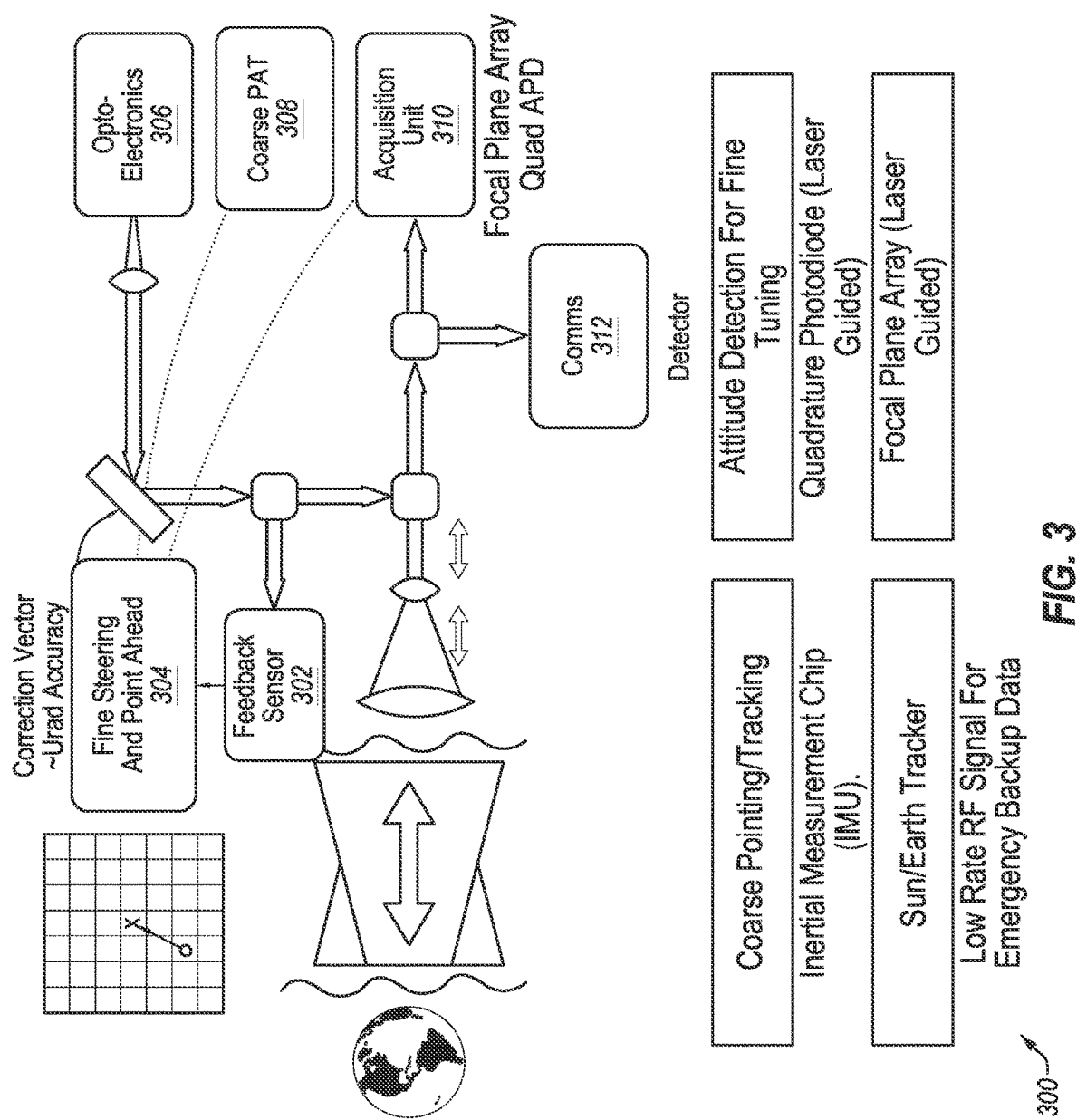
FIG. 3 shows a schematic diagram 300 illustrating the flow of information between various entities in a pointing, acquisition and tracking system for high speed communication, according to an example embodiment.

FIG. 3 shows a schematic diagram 300 illustrating the flow of information between various entities in a pointing, acquisition and tracking system for high speed communication, according to an example embodiment. The laser pointing, acquisition and tracking system may be configured to derive an exact location of sister nodes within very strict requirements on its size, weight and power parameters, and thus may achieve a specific Pointing and Attitude Detection accuracy within a highly dynamic thermal, vibration and radiation environment. As shown in FIG. 3, the pointing, acquisition and tracking system may include a feedback sensor 302, a fine steering and point-ahead module (or tracking module) 304, an opto-electronics module 306, a coarse pointing and attitude detection module (or pointing module) 308, an acquisition module 310 and a communications module 312. The fine steering and point-ahead module (or tracking module) 304 may include a correction vector with micro-radian accuracy while the acquisition module 310 may include a focal plane array, a quadrature avalanche photodiode or other forms of photo sensor arrays. In alternate embodiments, the acquisition module 310 may also be configured to acquire and characterize a plurality of laser beams while the fine steering and point-ahead module (or tracking module) 304 may be configured to track the plurality of laser beams. The focal plane array together with the quadrature avalanche photodiode may be configured to assist the pointing, acquisition and tracking system in fine tuning during attitude detection.

The communications module 312 may also include an avalanche photodiode (APD) a balanced APD or an array of APDs, which are highly sensitive photodiodes that operate at high speeds and high gain by applying a reverse bias. Such APDs are widely used in optical rangefinders, spatial light transmission and scintillation detectors. The coarse pointing and attitude detection module (or pointing module) 308 may include an inertial measurement chip (IMU), a Earth/Sun tracker and a rf/mm-wave signal to compliment data transfer.

Figure 4A:
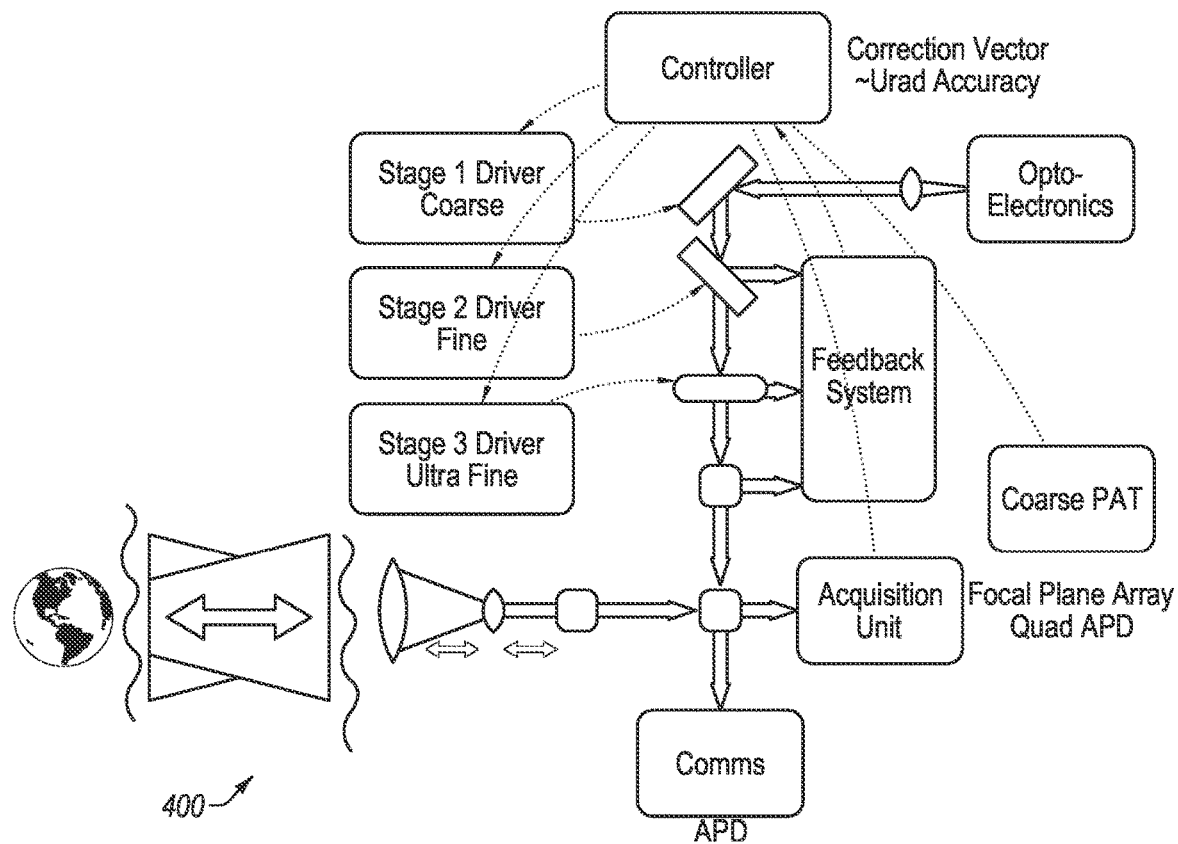
FIG. 4a shows a schematic diagram 400 illustrating the flow of information between various entities in the pointing module of FIG. 3 for high speed communication, according to an example embodiment.

FIG. 4a shows a schematic diagram 400 illustrating the flow of information between various entities in the pointing module of FIG. 3 for high speed communication, according to an example embodiment. The pointing module may be part of the tracking module 304 of FIG. 3 and may be configured to point at least one laser beam towards a target based on the acquired laser beams. Alternatively, the pointing module 308 may be a standalone module as shown in FIG. 3. The pointing module 308 may also include a multi stage beam steering unit where each level of the system provides a specific range and resolution for a beam steering mechanism. The multi stage beam steering unit may also be configured to steer at least one laser beam towards a target based on the acquired laser beams. As shown in FIG. 4a, the pointing module includes three stages for tuning. Depending on the application more or less stages may be applied. At stage 1, the beam undergoes coarse tuning using a stage 1 driver, this is to align the beam position over wide ranges. At stage 2, the beam undergoes fine tuning by Piezo Micro-Electro-Mechanical systems (MEMS) or other mechanical/non-mechanical beam steering technologies such as Spatial Light Modulators or Electro-Optical Elements with a stage 2 driver. At Stage 3 ultra fine tuning is applied. An example application for stage 3 would be for extracting additional information about the beam for tracking purposes. For example a temporal/spatial modifier can be used that creates a fast scanning beam that "spins" the beam very fast using a fast fine pointing mechanism (mechanical or non mechanical) allowing the system to extract extra spatial temporal data from the system and use it as a laser beam tracking mechanism. This part can also apply the point ahead angle if necessary as well. The implementation can be done using technologies mentioned for Stage 2 as well. This additional data can be used in the interferometric compute unit for further intelligent and adaptive decision making for the system.

Figure 4B:
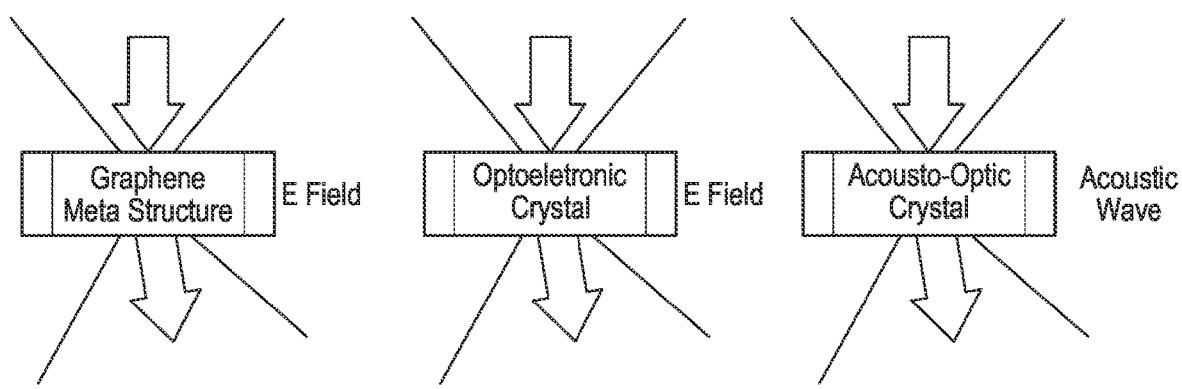

More importantly, the beam undergoes non-mechanical fine tuning at stage 3. FIG. 4b shows schematic diagrams illustrating the different embodiments of the non-mechanical fine tuning of stage 3 that may be executed by the pointing module of FIG. 4a. The non-mechanical fine tuning method may include changing one or more optical properties (e.g. refractive index/permittivity) of the multi stage beam steering unit in order to steer at least one laser beam towards the target based on the acquired laser beams. Changing one or more optical properties of the multi stage beam steering unit may include the steps of: a) a birefringent crystal material by applying an electric field and inducing the Pockels effect; b) tuning spatial light modulators; c) using a periodic metamaterial structure and tuning it by screening of an electric voltage; d) using acoustic waves and/or a holographic material to induce a diffraction grating on a crystalline structure, and e) modifying an output angle by modifying a frequency of an acoustic actuator. The non-mechanical fine tuning method may include a collimated beam that may be focused onto an integrated optical slab, which may reduce the overall physical interaction size required. This may advantageously allow much smaller amount of voltage and energy to be required in the design of the pointing module, creating a low powered fine tuning mechanism. The different mechanisms as disclosed may be integrated and may create high speed Micro-Radian or Nano-Radian deviations in an optical beam. The fine tuning mechanism may be in connectivity with an internal feedback system. An output power may be used as a feedback signal that may be transmitted to a fine tuning controller by having an input beacon move along an optical path. The fine tuning controller may be configured to use a plurality of signals created by the Focal Plane Array or Complementary Metal-Oxide-Semiconductor (CMOS) of the acquisition module to steer the fine tuning system to achieve maximum input power. An input power may be used as a feedback signal in a Neural Network algorithm.

Figure 5:
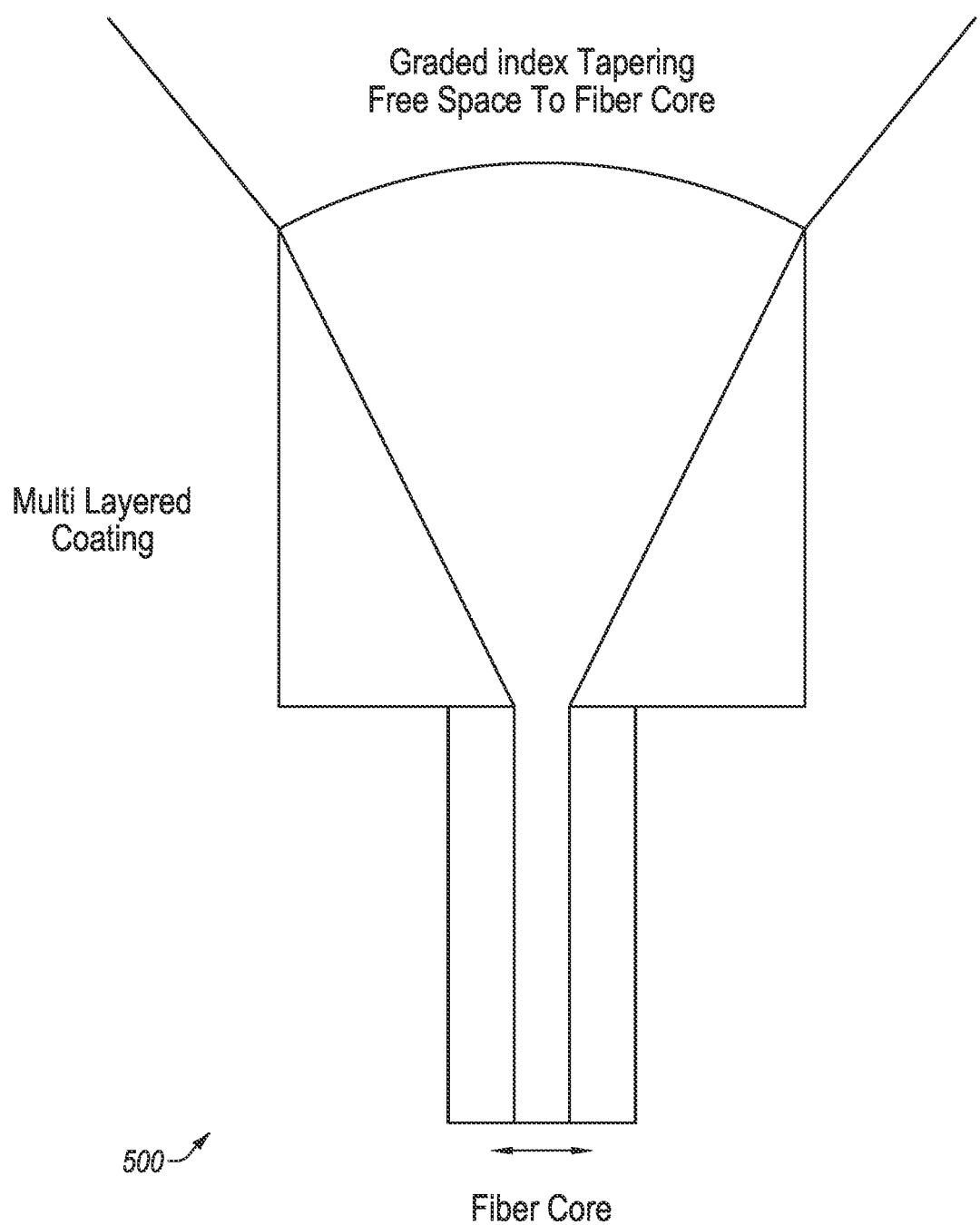
FIG. 5 shows a schematic diagram 500 illustrating a fiber photonic coupling waveguide of the acquisition module of FIG. 3, according to an example embodiment.

FIG. 5 shows a schematic diagram 500 illustrating a fiber photonic coupling waveguide (or mechanism) of the acquisition module 310 of FIG. 3, according to an example embodiment. In order to create a fully silicon integrated solution and drive down the total SWAP (Size Weight and Power consumption) parameters, the input beam in typical systems may be in connectivity with a fiber based unit. This requires accurate focusing of the input signal onto a core of a fiber waveguide. For a single or even multimode waveguide, usually the core of the fiber waveguide is nearly one order of magnitude smaller than a photodetector's surface, enforcing unnecessarily stringent alignment requirements on the systems. Even extremely slight misalignments may cause most of the focused energy to be misaligned from the fiber core and be lost to the surroundings. As a result, most current systems avoid such a problem by having light to be directly focused onto the surface of the photodetector. Such a design limits a system for high speed communication in geometry, design and results in bulky elements.

On the other hand, the fiber photonic coupling waveguide (or mechanism) may include a unique tapered fiber optic coupler which acts as a photon cone, and may effectively increase an effective surface size of the input fiber core in orders of magnitude. Such a design may allow effective coupling of light into the fiber optics efficiently and may enhance the robustness of the coupling mechanism. The unique tapered fiber optic coupler may also be less sensitive to beam deviation and may be configured to take advantage of integrated silicon photonics solutions. The structure of the claimed tapered fiber optic coupler may be created using a tapered graded index input cover by multilayers of dielectric/metallic/graphene coatings that optimized the reflection and diffraction properties.

Figure 6:
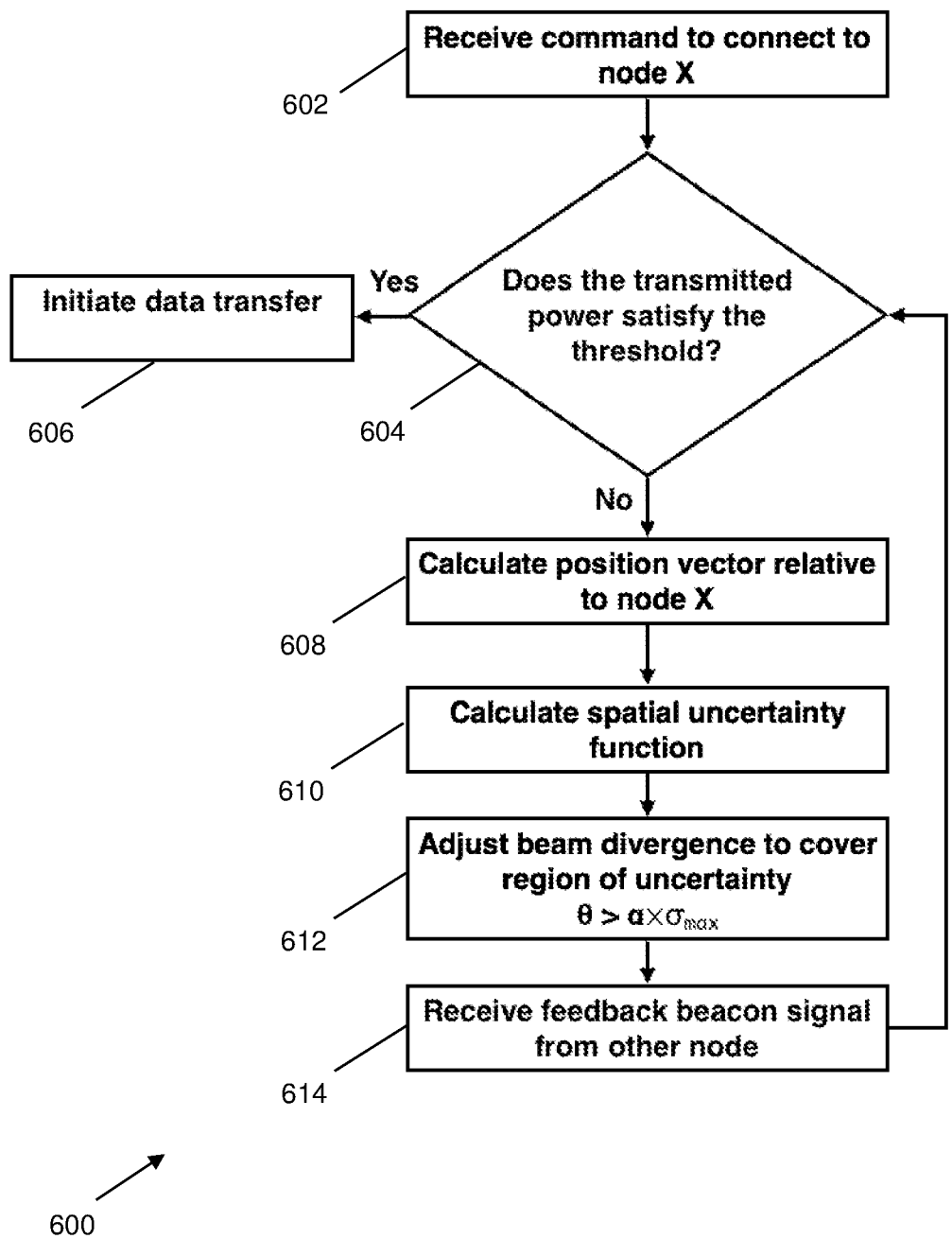
FIG. 6 shows a flow chart illustrating a method 600 for adaptive beacon beam divergence of a laser beaconing system for high speed communication, according to an example embodiment.

In certain embodiments of the present invention, a two-way laser beaconing system may be configured to receive fine tuning attitude information. The laser beaconing system may include a beaconing feedback and beam divergence mechanism which may be configured to control and detect a beam, thereby allowing each node to acquire their relative attitudes against each other with micro radian accuracy. Each communication node in the system will be sending a beacon signal that may enable it to broadcast its unique identifier and location to other nodes in the system. The physical wavelength of the beacon is chosen as between 800-850 nanometres to optimize and may provide the advantages of having maximum CMOS sensitivity, minimum background radiation, minimum atmospheric loss and the availability of a high powered source. The beacon may have an adjustable beam divergence allowing it to adjust the total illumination size of the receiving node. FIG. 6 shows a flow chart illustrating a method 600 for adaptive beacon beam divergence of a laser beaconing system for high speed communication, according to an example embodiment. At step 602, the system receives a command to connect to a node, e.g. node X. At step 604, the system determines whether the transmitted power satisfies a threshold. If it is determined that the threshold is satisfied, the system initiates data transfer at step 606. If it is determined that the transmitted power does not satisfy the threshold, the system calculates a position vector relative to the node at step 608. At step 610, the system calculates a spatial uncertainty function. At step 612, the system adjusts the beam divergence to cover a region of uncertainty such that $\theta > \alpha \times \sigma_{max}$, where $\theta$ represents an applied beam divergence, $\alpha$ represents a diffraction limited beam divergence and $\sigma_{max}$ represents an uncertainty factor. At step 614, the system receives a feedback beacon signal from the other node.

Figure 7:
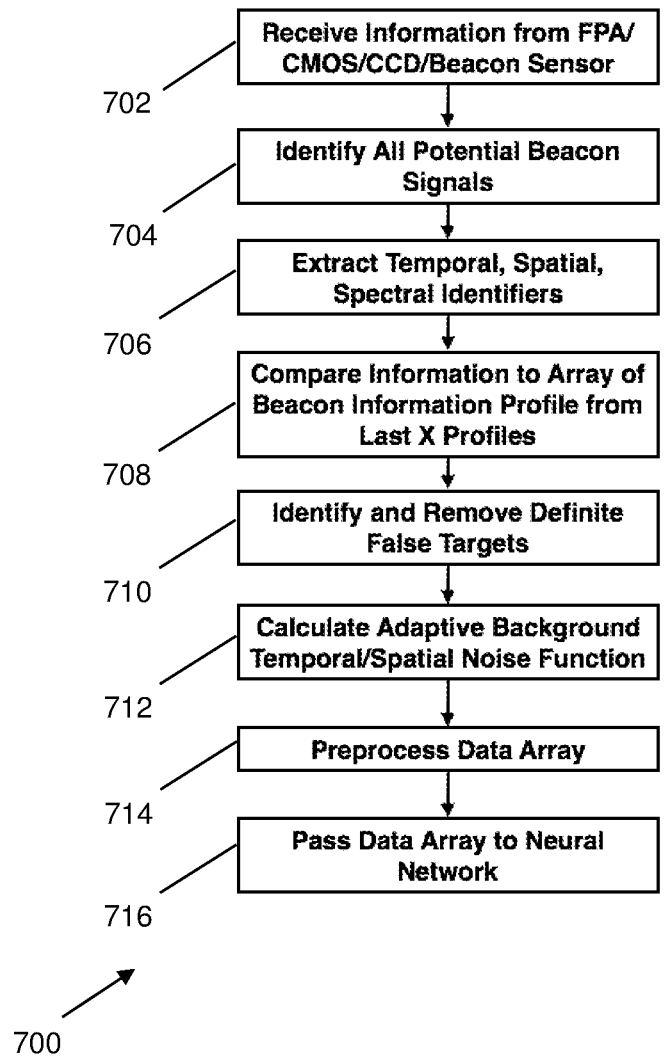
FIG. 7 shows a flow chart illustrating a method 700 for beacon detection for high speed communication, according to an example embodiment.

In order to maximise the acquisition accuracy of the beacon, the beacon signal may be modulated with unique identifiers allowing the acquisition system to identify it amongst various noise, turbulence, and fast and slow moving background information. More specifically, at least one of the acquired laser beams may be selected by extracting specific information from the acquired laser beams. This can be achieved by having beam detection using specific information of the beam such as beam spatial, temporal and spectral data. FIG. 7 shows a flow chart illustrating a method 700 for beacon detection or selecting at least one of the acquired laser beams for high speed communication, according to an example embodiment. At step 702, the method includes receiving information from the focal plane array/Complementary Metal-Oxide-Semiconductor/Charged-Coupled device/Beacon sensor. At step 704, the method includes identifying all potential beacon signals. At step 706, the method includes extracting temporal, spatial and spectral identifiers. In an alternative embodiment, the method may include extracting at least one of a temporal identifier, a spatial identifier and/or a spectral identifier. At step 708, the method includes comparing information to array of beacon information profile from the previous number of profiles. At step 710, the method includes identifying and removing a plurality of definite false targets. At step 712, the method includes calculating adaptive background temporal/spatial noise function. At step 714, the method includes pre-processing data array. At step 716, the method includes passing the processed data array to a neural network or an adaptive learning detection algorithm after removing the plurality of definite false targets. In an embodiment, the adaptive learning detection algorithm may be configured to remove the plurality of definite false targets as described in step 710. The method may also include determining and selecting an optimal beacon signal from the plurality of beacon signals (not shown in FIG. 7).

In embodiments, the acquisition module 310 of FIG. 3 may be configured to continuously receive multiple beacon signals from its surrounding nodes. The acquisition module 310 may take into account the overall channel quality for communication and optical power transfer between each of these nodes and prioritizes and rates them based on the highest reliability and capacity and instructs the controller to use that specific node. The acquisition module 310 may also prioritize based on spatial characteristics and/or temporal characteristics of the acquired laser beams (or beacon signals). If the quality of the channel is deteriorating, the acquisition module 310 may automatically re-prioritize the rating system allowing the controller to switch the link to the new highest ranked channel. In addition, this ranking information is used to estimate the channel's information/power capacity. The optoelectronic module 306 of FIG. 3 modifies its transmission rate using Adaptive Coding and Modulation (MODCOD) based on the estimation, which may allow a transceiver to be configured to maximize a channel capacity. Such a mechanism may also enable predictive feedback link acquisition within milliseconds to allow automated switching and handovers between multiple nodes in the same window, with minimum possible downtimes. In an alternate embodiment, the tracking module (or fine steering and point-ahead module) 304 of FIG. 3 may include a site diversity unit configured to select the acquired laser beams based on at least one of: a reliability of the beam; a capacity of the beam; spatial characteristics of the beam and/or temporal characteristics of the beam.

Figure 8A:
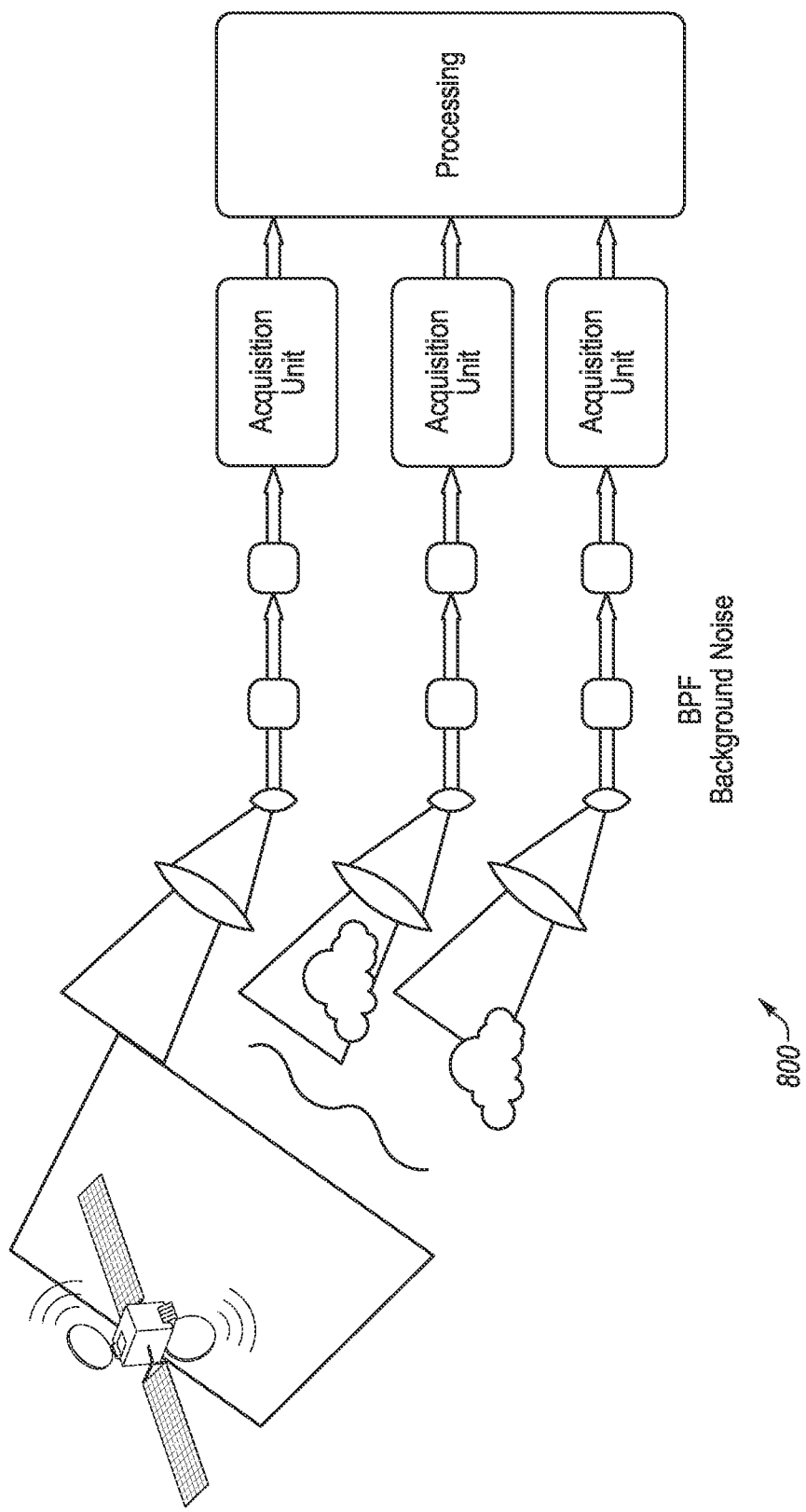
FIG. 8a shows a schematic diagram 800 illustrating a plurality of beam diversity techniques from multiple nodes for high speed communication, according to an example embodiment.
Figure 8B:
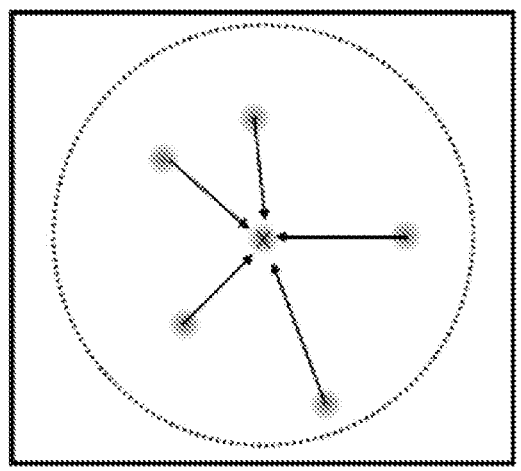
FIG. 8b shows a schematic diagram 850 illustrating a multi-link beam acquisition window input for high speed communication, according to an example embodiment.

FIG. 8a shows a schematic diagram 800 illustrating a plurality of beam diversity techniques from multiple nodes for high speed communication while FIG. 8b shows a schematic diagram 850 illustrating a multi-link beam acquisition window input for high speed communication, according to an example embodiment. As shown in FIG. 8a, the technique may include a plurality of acquisition units (or modules) in multiple nodes acquiring beams. Laser guide stars and lucky algorithms or other adaptive optics methods may be incorporated with spatial diversity techniques to enhance signal reception and transmission. This may include optimizing the beam phase front's spatial and temporal profile to insure the beam. Advantageously, this may ensure the beam is non-destructively interfered when focused. In addition, a band-pass filter may be included to filter out the background noise. Further, ultra-sensitive photon counting methods using balanced or non-balanced avalanche photon detectors may be used to detect data on the beams. The above-mentioned techniques may optimize special diversity such that beam acquisition availability can be more than 99.7%. Other Maximum Ratio Combining Techniques may also be included to further maximise the power diversity effect by sensing the signal to noise ratio of each collected signal and combining them with ratios to maximise the final output. The final received power can be combined in a coherent or non-coherent manner. These techniques may advantageously combine multiple beam paths and may allow smaller and more robust ground stations.

Figure 9:
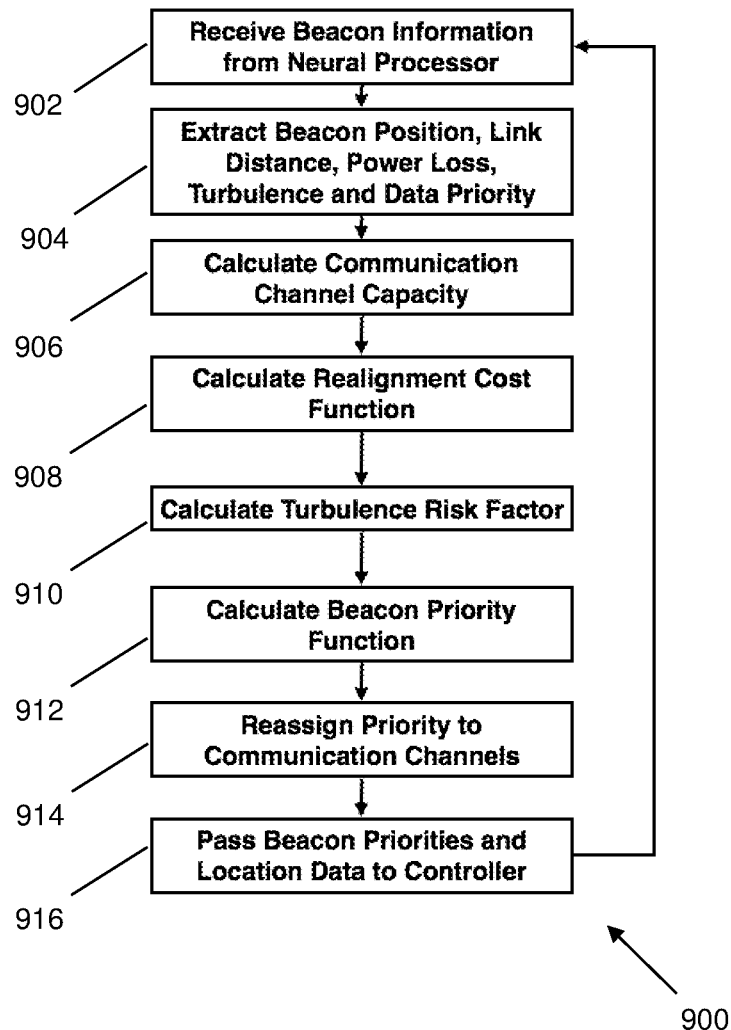
FIG. 9 shows a flow chart illustrating a method 900 for beacon diversity of a multi-input, multi-output channel rating system for high speed communication, according to an example embodiment.

FIG. 9 shows a flow chart illustrating a method 900 for beacon diversity of a multi-input, multi-output channel rating system for high speed communication, according to an example embodiment. At step 902, the method includes receiving information from at least one of: a focal plane array, a Complementary Metal-Oxide-Semiconductor sensor, a Charged-Coupled device and a Beacon sensor. At step 904, the method includes extracting a beacon position, link distance, power loss, turbulence and/or data priority. At step 906, the method includes calculating a communication channel capacity. At step 908, the method includes calculating a realignment cost function. At step 910, the method includes calculating a turbulence risk factor. At step 912, the method includes calculating a beacon priority function. At step 914, the method includes reassigning priority to a plurality of communication channels. At step 916, the method includes passing a plurality of beacon priorities and location data to a controller.

In embodiments, there is included an adaptive learning-based acquisition, tracking and sub-pixel resolution detection algorithm. A plurality of computer vision algorithms can perform a HSV extraction, filtering, blob detection and subsequent Hough transform and object detection using a heuristic driven approach. This approach may achieve a statistical accuracy which can be improved by orders of magnitude using an adaptive learning driven approach. A fast, recurrent adaptive neural network, such as a Regional Convolutional Neural Network (R-CNN) or a Long Short Term Memory network (LSTM), may include an adaptive learning detection algorithm that has been trained to extract, identify and track a unique optical signature amongst the background image can bring in high levels of accuracy, reliability, repeatability and speed to execution. The adaptive neural network, which may be part of an adaptive learning unit and when fully trained using reinforcement learning, can understand the intensity profile of the beacon blob over a group of adjoining pixels within the frame image obtained from the focal plane array or a similar array of imaging sensors. Any shift in intensity allows the adaptive learning detection algorithm to track node movement (or location) relative to the beacon at a sub-pixel level resolution. The above information provided by the adaptive learning system (or adaptive learning unit) to the controller system allows the controller system of the node to calculate a correction vector and provide control signals for re-aligning the parent system to the incoming beacon.

Figure 10:
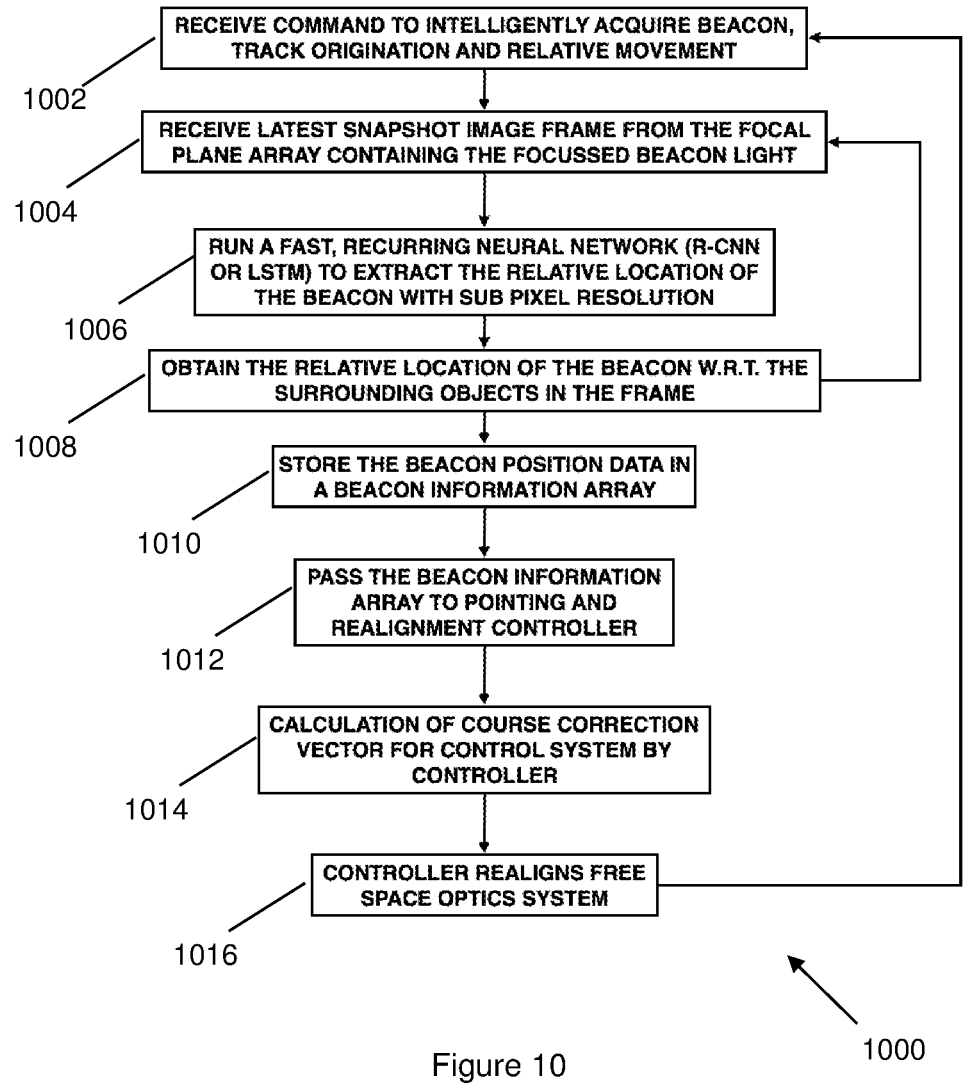
FIG. 10 shows a flow chart illustrating a method 1000 of an adaptive learning-based acquisition, tracking and sub-pixel resolution detection algorithm for a for high speed communication, according to an example embodiment.

FIG. 10 shows a flow chart illustrating a method 1000 of an adaptive learning-based acquisition, tracking and sub-pixel resolution detection algorithm for a for high speed communication, according to an example embodiment. At step 1002, the method includes receiving a command to intelligently acquire a beacon, track its origination and its relative movement. At step 1004, the method includes receiving a latest snapshot image frame from the focal plane array containing the focused beacon light. At step 1006, the method includes running a fast, recurring neural network (such as a R-CNN or a LTSM) to extract the relative location of the beacon with sub-pixel resolution. At step 1008, the method includes obtaining the relative location of the beacon with respect to the surrounding objects in the frame. At step 1010, the method includes storing the beacon position data in a beacon information array. At step 1012, the method includes passing the beacon information array to a pointing and realignment controller. At step 1014, the method includes calculating a course correction vector for the control system by the controller. At step 1016, the method includes realigning, by the controller, a free space optics system.

In embodiments, the system for high speed communication may include an interferometric analysis for extracting beam characterization from a beacon signal. The input beacon signal, when collimated directly onto the focal plane array (FPA) or a Complementary Metal-Oxide-Semiconductor (CMOS) sensing array, only reveals information on the amplitude distribution of the phase front of the beacon signal. In order to extract more accurate information (or specific information) on the beacon beam such as the phase distribution on the beam front, beam divergence, polarization, relative input angle, spectral shifting and Doppler information, an interferometric and compute system is placed in the beam path that systematically interferes the beacon and a reflection of it together onto the FPA/CMOS beacon sensor. The interferometric and compute system may be part of a laser beam characterization unit of the acquisition module of Figure Sand may extract specific information such as the amplitude as well as phase related information from the beacon. This information is fed into an image processing algorithm that extracts the spot size, interference area, fringe angle and distances between the depths and minimums of the fringes and uses them to calculate the relevant properties of the beam. This interferometric method may be applied using various forms of optical components to create specific phase interference patterns, for example, mixing of light with different focal lengths, focusing the light into multiple focal point (similar to a micro-lens array) or more customized optical modifiers. The optical element implementing these patterns may be a Liquid Crystal Array or a Spatial Light Modulator that may enable real-time changing of the patterns.

Figure 11:
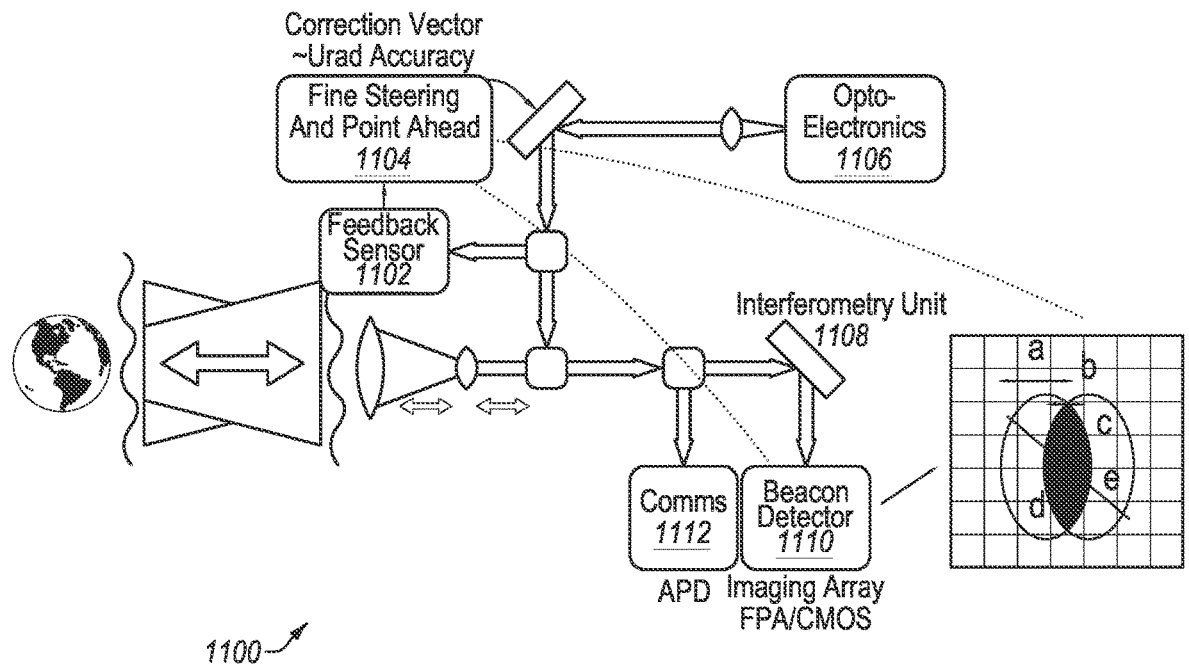
FIG. 11 shows a schematic diagram 1100 illustrating the flow of information between various entities in an interferometric acquisition system for high speed communication, according to an example embodiment.

FIG. 11 shows a schematic diagram 1100 illustrating the flow of information between various entities in an interferometric acquisition system for high speed communication, according to an example embodiment. As shown in FIG. 11, the interferometric acquisition/transmission system may include a feedback sensor 1102, a fine steering and point-ahead module 1104, an opto-electronics module 1106, an interferometry module 1108, a beacon detector 1110 and a communications module 1112. The fine steering and point-ahead module 1104 may include a correction vector with micro-radian accuracy while the communications module 1112 may also include an avalanche photodiode (APD) which is a high sensitivity photodiode that operates at high speeds and high gain by applying a reverse bias. Such APDs are widely used in optical rangefinders, spatial light transmission and scintillation detectors. The beacon detector 1110 may include an imaging array such as an FPA/CMOS sensor such that beam characteristics may be captured as in an image/video. An example of such an image of the beam characteristics is shown as a grid in FIG. 11. In the grid, "a" denotes a beam size, "b" denotes a beam overlap, "c" denotes a fringe peak distance, "d" denotes a fringe minimum distance and "e" denotes a fringe angle. The aforedescription illustrate example components that may be extracted from the captures images/videos. The interferometric unit 1108 can be applied both on the incoming and outgoing beam with a similar function to an adaptive optics unit, ensuring that the transmitted and received power are both optimized for transmission through the atmoshoperic environment. The interferometric unit 1108 can be implemented using a Spatial Light Modulator or an Array of Liquid Crystals or other forms of active or passive optical elements that can modify a beams profile.

Figure 12:
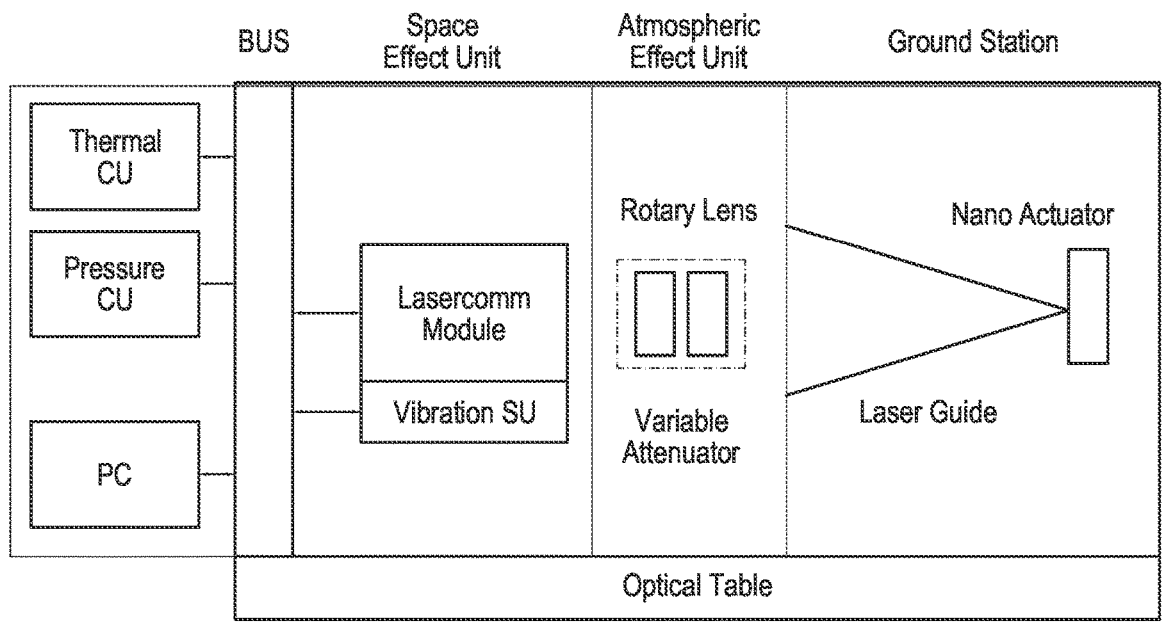
FIG. 12 shows a schematic diagram 1200 illustrating a photonic space simulation system for high speed communication, according to an example embodiment.

In embodiments, the system for high speed communication may include an integrated space and atmospheric photonic simulation testbed that may fully simulate the effects from the ground station, atmosphere and space environment in a single test unit. FIG. 12 shows a schematic diagram 1200 illustrating a photonic space simulation system for high speed communication, according to an example embodiment. The photonic simulation system may include a ground station, an atmospheric effect unit, a space effect unit, an optical table and a bus. The bus may be in connectivity with a thermal control unit, a pressure control unit and a compute and display unit (PC as shown in FIG. 12). The space effect unit may include a laser communications module and a vibration server unit that is in connection with the bus. The atmospheric effect unit may include a rotary lens train with various phase profiles, a variable attenuator and/or rain/fog/snow simulators while the ground station may include a laser transceiver and a nano-actuator to simulate the ground station unit.

Figure 13:
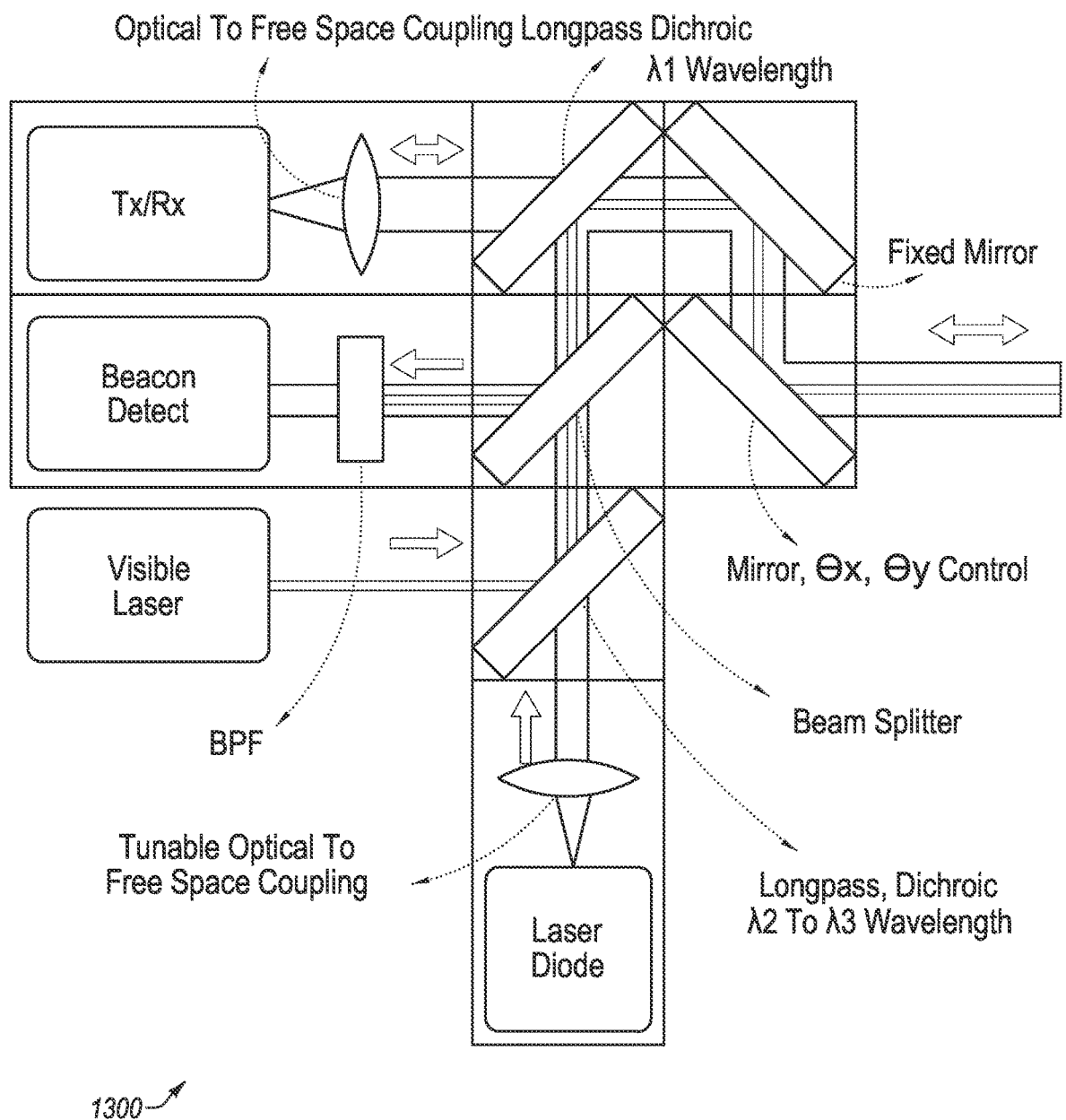
FIG. 13 shows a schematic diagram 1300 illustrating a laser communication module of the photonic space simulation system of FIG. 12, according to an example embodiment.

FIG. 13 shows a schematic diagram 1300 illustrating a monostatic laser communication module. This could be used in the photonic space simulation system of FIG. 12, according to an example embodiment or in any other laser communication device. The module may include a transmitter and a receiver, a beacon detector, a laser unit and/or a laser diode. The module may also include optical trains of various lenses, mirrors and dichroics, at least one tunable optical element allowing two-axis (ex and eo control of the beam and other higher order variations in the beams profile, at least one longpass dichroic mirror having a wavelength of a, at least one longpass dichroic mirror having a predetermined wavelength (e.g. 650-800 nanometres), at least one beam splitter having a predetermined wavelength (e.g. 650 nanometres) and a coating (e.g. 850 nanometres) and at least one band-pass filter in connectivity with the beacon detector. The transmitter or receiver may be in connectivity with a fixed plano convex lens having a predetermined focal length (e.g. 50 millimetres) and a coating (e.g. 1310 nanometres to 1550 nanometres) at one end. The fixed plano convex lens may be in connectivity with the at least one longpass dichroic mirror having a wavelength of A1 at the other end. The laser diode may be in connectivity with a standard or flat lensing system and is in connectivity with the at least one longpass dichroic mirror having a wavelength A2 to A3 at the other end. The band-pass filter is in light path with the beacon detector at one end and the beam splitter at the other end.

The workings of the laser communication module of FIG. 13 are described as follows. A beam is produced by the laser source and passes through the tunable lensing system. It then passes through the optical train and is combined and aligned with all other optical beams and exists the final input/output aperture. At the same time, the system may include a visible laser unit that produces a visible laser beam which also passes through the optical train and integrates with the beams. This beam combined with the transmission (Tx) beam and the beacon laser beam all go through the same optical path and exit the device though as single aperture. The same aperture is used to input multiple beams inside the unit. Once a beam is received, it may pass through a beam splitter and/or dichroic and splits into two or more beams based in its wavelength, angle of arrival or power parameters. One of the split beams may be received by the beacon detector via the band-pass filter. The other split beam is received by the A1 wavelength longpass dichroic mirror and goes to the receiver (Rx). All input and output beams are integrated and aligned inside the optical paths and go through a single aperture. The tunable mirrors and optics system can uniformly adjust all the incoming and outgoing beams.

Figure 14:
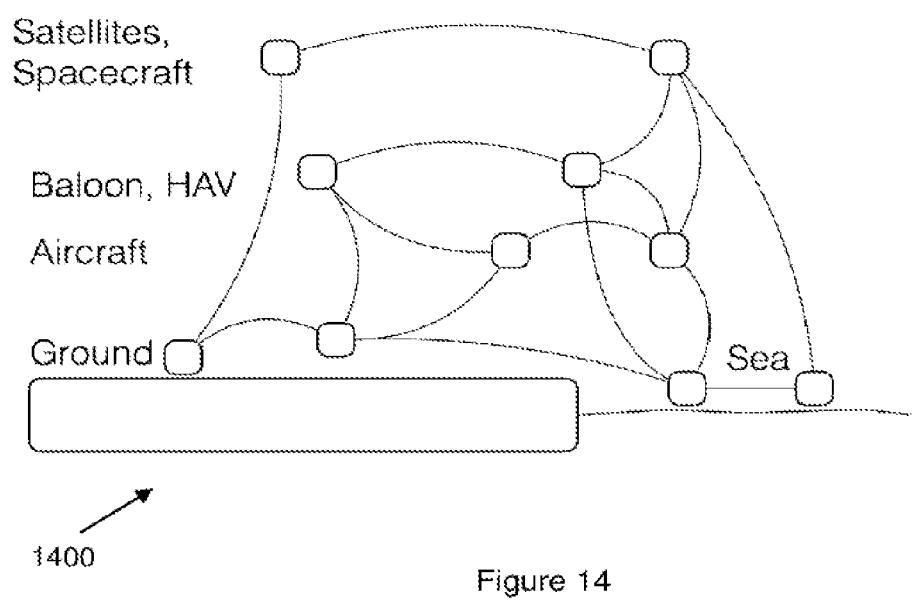
FIG. 14 shows a schematic diagram 1400 illustrating a laser data or power transfer network layout for the usage of the system 100 of FIG. 1 or system 1300 of FIG. 13, according to an example embodiment.

FIG. 14 shows a schematic diagram 1400 illustrating a laser data or power transfer network layout for the usage of the system 100 of FIG. 1 or the monostatic laser communication module 1300 of FIG. 13, according to an example embodiment. The laser data or power transfer network of FIG. 14 shows the laser-based system in a ground-air-sea-space data network. The laser data or power transfer network may include a satellite constellation network that may create a constellation of satellites that use very accurate lasers to transfer bidirectional data between satellites amongst various orbits, to ground stations, to aircrafts, to marine vessels, to moving vehicles or to outer space. The satellite constellation network may also provide internet access to remote areas using a network of moving balloons or drones which connect to each other to exchange information or transfer data amongst themselves and to the ground. The satellite constellation network may also provide a network of ground communication nodes working in tandem with drones to provide a meshed network of point to point communications for data centers, financial institutions, islands, offshore platforms, cargo and cruise ships. A potential application of such a network may be to achieve a space data network based on Low-Earth Orbit Nanosatellites. These satellites will be communicating with each other and also to ground stations using laser communication links.

A plurality of terrestrial ground links may also be present as usage of the system 100 of FIG. 1 and the monostatic laser communication module 1300 of FIG. 13. The plurality of terrestrial ground links may provide development of a one to over 1000 Gigabit per second (Gbps) terrestrial level laser communication link, and may be designed and optimized to work within the atmospheric weather conditions of a region (e.g. Singapore). This may result in having the necessary knowledge to achieve a basic transceiving unit able to encode 1000 Gbps of digital data onto a laser carrier. It may also provide specific technical knowledge on microwave circuit design optimized for stable and efficient switching of distributed feedback lasers, efficient near diffraction limited free space optics, alignment technology for the out coupling of laser into atmosphere and in-coupling into a low noise avalanche photodiode, and a low noise amplifier system on the receiving end to amplify the detected signal by at least 20 dBs. In addition, a basic angle of arrival detection algorithms may result in approximately 0.001-degree accuracy for angle of arrival of laser beam and a highly accurate and repeatable tracking algorithm which may detect minor vibrations within this range and realign the system to achieve maximum stability.

In embodiments of the present invention, the laser communication system 100 may provide the following example parameters during usage: data transmission rate of up to 1 or more Tbps (Terabit pser second); Attitude detection precision and accuracy of less than one mirco-radians; Laser beam steering pointing capability precision and accuracy of less than one mirco-radians; Active beam steering jitter correction able to correct random fluctuations within 2 kiloHertz (kHz) or higher; Thermal stable operation from −40 degrees Celsius to 80 degrees Celsius or more; Maintain link connectivity and a margin of more than 3 dB in the following weather conditions: Humidity of up to 100%; Haze having a Visibility of less than 1 kilometre; Direct sunlight into aperture; Rainfall of 250 millimetres per hour or more; and Temperature swings between −40 degrees Celsius to 80 degrees Celsius or more.

Extreme SWaP (Size, Weight, Power) limitations at outer space may force laser communications systems to ideally operate at a diffraction limited beam. This may require the satellite system to be able to accurately detect its attitude in relation to the ground station of interest within precision and accuracy in the order of approximately 1 micro radian or better. As a result, the satellite system may be required to accurately point and actively steer the beam within micro-radian accuracy. Furthermore, accurately pointing and steering the beam may be more challenging given the fact that Satellites in the Low Earth Orbit (LEO satellites) are constantly orbiting the earth with very high speeds. This leads to specific vibration profiles on the satellite that depends on its structural properties and may have a spectrum as high as 1-2 kHz. In addition, LEO satellites may experience extreme thermal and radiation changes throughout each orbit. The laser communication system as disclosed in the present invention may be able to actively steer the laser communication link at the exact location of interest within very strict requirements on its SWaP parameters and achieve a specific Pointing and Attitude Detection (PAT) accuracy within a highly dynamic thermal, vibration and radiation environment. The system as disclosed may meet the above basic requirements on a simulated indoor environment on the ground within the parameters as described above.

In addition, the system for high speed communication of the present invention may take into account atmospheric effects in Satellite-Ground links. Clouds, rainfall, temperature gradients (scintillation), humidity and haze etc. all cause random turbulence and fluctuations in a laser beam's propagation across the atmosphere. These can result in major changes in the link budget estimations in a communication link and need to be carefully considered when designing a communication system. The system as disclosed may quantify these varying parameters under a controlled indoor environment and may provide a communication link that can compensate for these effects to maintain the required link margins for its operation.

The system for high speed communication of the present invention has been designed such that space operation technical requirements have been considered. Any engineering unit operating from space will have specific technical limitations imposed on it. Major technical considerations arising from such an environment include Thermal Stability. The satellite module in the LEO orbit will be constantly orbiting earth approximately every 90 minutes. During different times of this orbit it will be subject to extremely different thermal conditions considering the amount of radiation it is receiving from the sun. These thermal conditions can affect the system in various ways: a) Laser Wavelength Detuning: laser modules can be highly sensitive to temperature making thermal stability highly important b) Lens and Free Space Optical Devices Alignment: considering the diffraction limited operation of the free space optic units even slight changes in temperature may have significant effects on alignment of the modules c) Sensor Operation: fine steering micromechanical and piezo electric units performance can be strongly affected by temperature changes d) Sensor Noise Levels: noise levels in sensing system of the Avalanche Photodiode and the Focal Plane Arrays.

A second technical consideration is Vibration, Jitter and Shock Testing. During the launch stage, the satellite and the on-board module will be subject to extreme amounts of shock and vibrations. In order for the unit to be able to survive the launch stage, it must follow certain engineering protocols to guarantee its safe arrival in orbit. In addition, while orbiting in space, the satellite in the LEO orbit, depending on their structural design and mass distribution, will follow certain vibrational patterns. These vibrational patterns must be compensated for, using the laser modules self-aligning mechanism. A third technical consideration is Radiation Hardening: Parts of the module will be receiving extreme amounts of radiation during operation. Therefore, the module components are designed to have at least a 3 to 5 years active lifetime resistance against such harsh radiation environments.

Further, the system for high speed communication as disclosed has been designed with consideration of regulations in various jurisdictions. This is because operation of high powered laser beams in free space and their technology is regulated by various laws and guidelines in different jurisdictions. The following regulations have been considered in the design of the present invention: The first regulation that is considered is Laser Safety regulation. Such a regulation concerns the requirements for eye safety. A general guideline for the maximum ocular power emission is less than 0.1 Watt per cm2. The second regulation that is considered is Component Selection Constraints. Technologies related to space and satellite communications links fall under the international traffic in arms regulations. The system may be based on purely Non-ITAR (International Traffic in Arms Regulations) components to avoid such limitations. The second regulation that is considered is Aviation regulations. For safety of airline traffic and to avoid possible concerns of high power lasers on aircrafts and pilots' navigations, certain jurisdictions have assigned limitations on laser propagation in free space or on specific air traffic routes for aviation safety purposes which are considered in the claimed invention. Spectrum Licensing may also be required for spectrum licensing and airline eye safety, such as having trial licenses to operate within the radiometric properties required by the system.

The laser communication system 100 for high speed communication as disclosed has also been designed with radiometric link budget calculations. For any communications link, the total achievable efficiency can be estimated by considering various forms of the communication channel that will be used. For example, a basic link budget calculation may be provided for the envisioned communication system under clear and highly fogged conditions. Based on estimated calculations, the Free Space Optics channel as disclosed in embodiments of the present invention may relay over 10 Gbps of data even under a worst-case scenario. These values can be highly increased by using more sensitive photo counting sensors, larger receiver apertures or pushing the beam optics towards diffraction limited performance.

Figure 15:
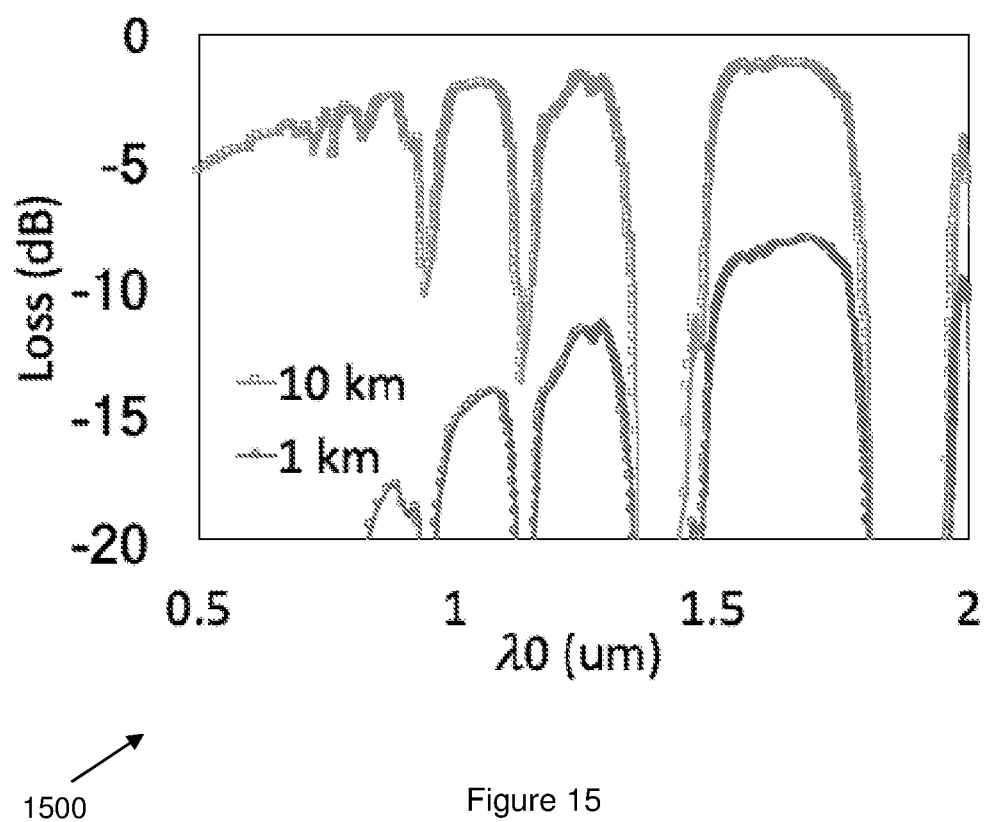
FIG. 15 shows a graph 1500 illustrating estimates for atmospheric loss spectrum during the usage of a laser communication system 100 of FIG. 1, according to an example embodiment.

FIG. 15 shows a graph 1500 illustrating estimates for atmospheric loss spectrum during the usage of a laser communication system 100 of FIG. 1, according to an example embodiment. Atmospheric losses are of major concern, particularly with high susceptibility of fogs and moisture during various times of the day. In order to take these effects into account, calculating the overall atmospheric losses in a tropical urban environment have been considered for the claimed invention. In extreme situations where the visibilities become approximately 1 km or less, communication bands may still exist that has an overall loss of less than 10 dBs. An accurate numerical modelling of the atmospheric loss was calculated using accurate models for the claimed invention. These values are calculated for weather parameters in a tropical climate (e.g. Singapore).

Currently, there are two main alternative approaches to solve the issue of higher bandwidth for satellite applications: 1) Radio Frequency: Shifting to Ka Band and 2) Laser: Low Earth Orbit to Geostationary (GEO) Relay Satellites. For the first approach of shifting to Ka Band, incremental improvement toward higher microwave frequencies may be used. Since currently most of the spectrum in these regions has already been allocated and cannot handle current data needs, most communications companies have decided to shift their communications into the Ka Band. The best example of this approach is Ka Band High Throughput Satellites (HTS). For example, in a state of the art, HTS multiple of more than 50 separate Ka Band transponders have been installed on a GEO satellite, generally with an overall cost of approximately $0.5 Billion. Radio Frequency (RF) technology has a limited bandwidth and will become very quickly congested. Due to this, Ka Band is becoming highly regulated and bandwidths are being assigned very quickly. Ka-band is susceptible to water vapor and does not provide high energy efficiency per bit transferred. The state of the art of Ka-Band technology costs is in the order of approximately $500 million. Such a system provides overall data rate through more multiple Ka Band transponders. They generally also weigh up to a few tonnes and consume kilowatts (kW) of energy. These solutions can provide broadband TV or internet links with speeds of approximately 10 Mbps for each user however cannot address the need for other applications such as earth observation, navigation, high bandwidth and especially low latency networks.

The second approach of having Laser: Low Earth Orbit to Geostationary (GEO) Relay Satellites to solve the bandwidth problem has been the approach taken by the joint mission in various space agencies. For example, a Laser Communication Terminal (LCT) has been built which needs to be installed onto a LEO satellite. Once the satellite is in orbit it will send its data through a laser beam to a GEO satellite. The GEO satellite will relay the information back to the ground using a RF link. Even though a laser solution is used in this approach, it is fundamentally limited by the final connection to earth which is through an RF link. As a result, the RF link is the main bottleneck of the system and it will have all of the disadvantages of the first approach. In addition, the LCT module in this system typically weighs over 50 kg and is quite large making it impractical for nanosatellites which are the main drivers in the current space market. These relay satellite can typically offer 1-2 Gbits/sec downlink and can cost hundreds of millions of dollars.

Embodiments of the present invention may provide a solution to the above two approaches with considerations of the SWaP (Size, Weight, Power) of the satellite compared to the amount of data transferred, total cost of satellite, spectrum licensing, Link Latency and Scalability of approach. The claimed invention provides laser based communication links to relay the information back to earth. The system of the claimed invention may be completely compatible with the SWaP parameters of a Nanosatellite and may allow extreme scalability through them. In addition, the claimed system is designed to operate from the LEO orbit that may allow extremely low latencies, faster than what is available with current fiber optics (as low as one third of the best current fiber latencies). The system of the claimed invention may also enable a new range of applications that were not possible using the previous approaches such as low latency networks, global continuous (24 hours 7 days a week) real-time surveillance and cost effective high bandwidth for real-time flight data transfer.

As described above, the system of the claimed invention may provide an approach to Pointing Accuracies & Beamforming. This can be realized by using a unique, 3-step, closed loop feedback system for delivering the single-digit micro-radian pointing accuracies and beamforming needed to accurately send data across LEO satellites as well as between a LEO satellite and ground. In alternative embodiments, the system may be more or less than 3-steps depending on the type of application. The system may provide the advantage of having a lower price point and also stay ahead of the curve at all times. Further, the system of the claimed invention may provide an Observatory Network for Ground-Station-as-a-Service. This can be realized by utilising existing astronomical observatory networks around the world by retrofitting the base station equipment of the current invention to the optic output from the telescopes of existing astronomical observatory. This may allow rapid introduction to new ground stations in a short amount of time and also reduce time, money and effort spent, thereby significantly boosting defensibility in the long run.

The system of the current invention may thus provide the following advantages of having more bandwidth, high bandwidth for mobile and remote platforms, utilization of maturation and decreasing costs of silicon photonics industry tailoring to the fiber optics market, promoting the growth of nanosatellite technology and utilization of lower nanosatellite launch costs and frequency.

The system of the claimed invention may also provide low cost of manufacturing which can be realized using manufacturing scalability that covers the following subsystems which have different levels of scalability: Optoelectronics subsystem of the current invention will be based on Silicon Photonics components, Integrated lasers and optics and High speed electronics. All these components may have highly matured and scaled manufacturing processes; the Free Space optics components of the current invention require precision mechanical design and alignment. The manufacturing processes of diffraction limited optics is commercial provided by many companies. However, the alignment process needs to be done in a semi-automated testing facility. The Pointing, Acquisition and Tracking system of the current invention may make use of advancements in microelectromechanical systems (MEMS) and nanoelectromechanical systems (NEMS) technology integrated into CMOS processes that have allowed extremely accurate high performance sensors enabling very accurate measurements of various parameters to be done in Inertial Measurement Units. A specific set of core components may be customized using the same scalable processes accepted in the industry. The satellite technology of the current invention may use Nanosatellite technology which has become widespread and reducing costs. Nanosatellites standards are currently accepted and many private companies provide their own open source technical development kits and satellite bus information. Embodiments of the present invention may be leveraging nanosatellite and microsatellites technology as the spacecraft of the laser terminal. All design parameters of the present invention may fit within the requirements of Nanosatellites.

Embodiments of the present invention may offer a plug-and-play solution for satellite communication, which uses lasers to achieve data transmission rates of up to one Terabits per sec (Tbits/sec). Such a capability may deliver connectivity solutions for, but not limited to: Spacecraft to satellites/ground stations; satellite-to-satellites; satellite-to-ground station; satellite to aircraft; high altitude vehicles; satellite to sea; ground to ground; ground to aircraft and high altitude vehicles; ground to sea; aircraft and high altitude vehicles to aircraft and high altitude vehicles; aircraft and high altitude vehicles to sea; and sea to sea. It may also provide the advantages of having high bandwidth, low power, small sized, instantly deployable, un-jammable, secure and long distance communication systems. In tandem, the network of ground observatories operating with laser communication modules may be able to provide continuous real-time uplink and downlink to satellites. The present disclosure may also maintain a high reliability network through space and Earth's atmosphere using micro-radian pointing accuracies, ground station optimization, beam diversity and adaptive optics. Furthermore, embodiments of the present invention may also provide low cost of development; a pointing, acquisition and tracking (PAT) technique focusing on Nano-satellite Low Earth Orbit (Nanosat LEO) use; non-ITAR and a focus on ground station network to prevent bottleneck of transmission data in the beginning.

Other advantages of the claimed invention may include higher efficiency, new novel approach, less delays, lower latency, more data, less energy requirements, smaller apparatus, higher bandwidth, less mechanical parts and faster connectivity. The present disclosure can be used in any situation where line of sight tracking and alignment is required within two or multiple nodes. This can be used in multiple commercial industries including aerospace, telecommunication, satellite services, military & defence, low latency financial services, etc.

Further advantages may also include less mechanical; small Size Weight and Power consumption (SWAP); micro-radian accuracy; extremely reliable due to a closed bi-directional feedback look with fallback mechanisms, intelligent algorithms which rely on learning rather than fully on heuristics; spatial diversity.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

Figure 16:
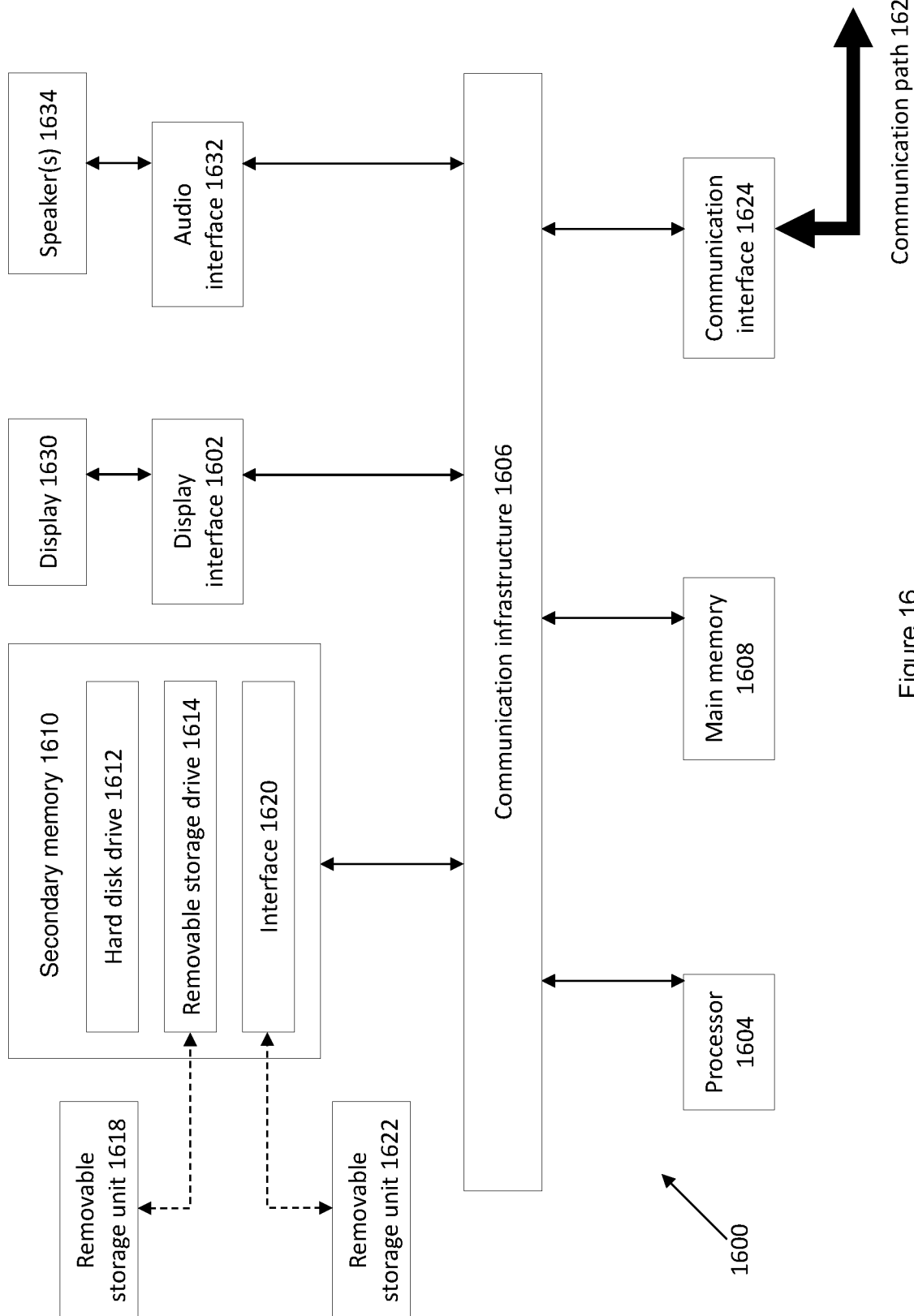
FIG. 16 shows an exemplary computing device 1600 to realize a module for the signal conditioning module 102, the attitude detection and control module 104 and the free space optics module 106 shown in FIG. 1.

FIG. 16 shows an exemplary computing device 1600 to realize a module for the signal conditioning module 102, the attitude detection and control module 104 and the free space optics module 106 shown in FIG. 1. The following description of the computing device 1600 is provided by way of example only and is not intended to be limiting.

As shown in FIG. 16, the example computing device 1600 includes a processor 1604 for executing software routines. Although a single processor is shown for the sake of clarity, the computing device 1600 may also include a multi-processor system. The processor 1604 is connected to a communication infrastructure 1606 for communication with other components of the computing device 1600. The communication infrastructure 1606 may include, for example, a communications bus, cross-bar, or network.

The computing device 1600 further includes a main memory 1608, such as a random access memory (RAM), and a secondary memory 1610. The secondary memory 1610 may include, for example, a hard disk drive 1612 and/or a removable storage drive 1614, which may include a floppy disk drive, a magnetic tape drive, an optical disk drive, or the like. The removable storage drive 1614 reads from and/or writes to a removable storage unit 1618 in a well-known manner. The removable storage unit 1618 may include a floppy disk, magnetic tape, optical disk, or the like, which is read by and written to by removable storage drive 1614. As will be appreciated by persons skilled in the relevant art(s), the removable storage unit 1618 includes a computer readable storage medium having stored therein computer executable program code instructions and/or data.

In an alternative implementation, the secondary memory 1610 may additionally or alternatively include other similar means for allowing computer programs or other instructions to be loaded into the computing device 1600. Such means can include, for example, a removable storage unit 1622 and an interface 1620. Examples of a removable storage unit 1622 and interface 1620 include a program cartridge and cartridge interface (such as that found in video game console devices), a removable memory chip (such as an EPROM or PROM) and associated socket, and other removable storage units 1622 and interfaces 1620 which allow software and data to be transferred from the removable storage unit 1622 to the computer system 1600.

The computing device 1600 also includes at least one communication interface 1624. The communication interface 1624 allows software and data to be transferred between computing device 1600 and external devices via a communication path 1626. In various embodiments of the inventions, the communication interface 1624 permits data to be transferred between the computing device 1600 and a data communication network, such as a public data or private data communication network. The communication interface 1624 may be used to exchange data between different computing devices 1600 which such computing devices 1600 form part an interconnected computer network. Examples of a communication interface 1624 can include a modem, a network interface (such as an Ethernet card), a communication port, an antenna with associated circuitry and the like. The communication interface 1624 may be wired or may be wireless. Software and data transferred via the communication interface 1624 are in the form of signals which can be electronic, electromagnetic, optical or other signals capable of being received by communication interface 1624. These signals are provided to the communication interface via the communication path 1626.

As shown in FIG. 16, the computing device 1600 further includes a display interface 1602 which performs operations for rendering images to an associated display 1630 and an audio interface 1632 for performing operations for playing audio content via associated speaker(s) 1634.

As used herein, the term "computer program product" may refer, in part, to removable storage unit 1618, removable storage unit 1622, a hard disk installed in hard disk drive 1612, or a carrier wave carrying software over communication path 1626 (wireless link or cable) to communication interface 1624. Computer readable storage media refers to any non-transitory tangible storage medium that provides recorded instructions and/or data to the computing device 1600 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 1600. Examples of transitory or non-tangible computer readable transmission media that may also participate in the provision of software, application programs, instructions and/or data to the computing device 1600 include radio or infra-red transmission channels as well as a network connection to another computer or networked device, and the Internet or Intranets including e-mail transmissions and information recorded on Websites and the like.

The computer programs (also called computer program code) are stored in main memory 1608 and/or secondary memory 1610. Computer programs can also be received via the communication interface 1624. Such computer programs, when executed, enable the computing device 1600 to perform one or more features of embodiments discussed herein. In various embodiments, the computer programs, when executed, enable the processor 1604 to perform features of the above-described embodiments. Accordingly, such computer programs represent controllers of the computer system 1600.

Software may be stored in a computer program product and loaded into the computing device 1600 using the removable storage drive 1614, the hard disk drive 1612, or the interface 1620. Alternatively, the computer program product may be downloaded to the computer system 1600 over the communications path 1626. The software, when executed by the processor 1604, causes the computing device 1600 to perform functions of embodiments described herein.

It is to be understood that the embodiment of FIG. 16 is presented merely by way of example. Therefore, in some embodiments one or more features of the computing device 1600 may be omitted. Also, in some embodiments, one or more features of the computing device 1600 may be combined together. Additionally, in some embodiments, one or more features of the computing device 1600 may be split into one or more component parts.

It will be appreciated that the elements illustrated in FIG. 16 function to provide means for performing the various functions and operations of the servers as described in the above embodiments.

In an implementation, a server may be generally described as a physical device comprising at least one processor and at least one memory including computer program code. The at least one memory and the computer program code are configured to, with the at least one processor, cause the physical device to perform the requisite operations.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A laser-based system for communication, the system comprising:
an acquisition module configured to acquire and characterize a plurality of laser beams; and
a tracking module configured to track the plurality of acquired laser beams, the tracking module comprising:
a beaconing feedback and beam divergence mechanism configured to control a beam of the plurality of acquired laser beams;
an adaptive learning unit configured to implement an adaptive learning detection algorithm to identify and track a unique optical signature from at least one of the plurality of acquired laser beams; and
a pointing module configured to point at least one laser beam towards a target based on the plurality of acquired laser beams;
wherein the beaconing feedback and beam divergence mechanism is further configured to execute the following steps, in no particular order, to detect a beam:
receive a command to connect to a node;
check if a transmitted power is higher than a threshold value;
calculate a position vector relative to the node;
calculate a spatial uncertainty function based on the position vector; and
adjust a beam divergence in relation to the spatial uncertainty.

2. The laser-based system of claim 1, wherein the acquisition module comprises:
a fiber optic coupling mechanism to couple the plurality of acquired laser beams to a fiber system; and
a laser beam characterization unit configured to extract specific information from the at least one of the plurality of acquired laser beams.

3. The laser-based system of claim 2, wherein the laser beam characterization unit comprises an interferometric and compute system configured to extract the specific information.

4. The laser-based system of claim 2, wherein the specific information comprises at least one of a temporal identifier, a spatial identifier and/or a spectral identifier.

5. The laser-based system of claim 2, wherein the fiber optic coupling mechanism comprises a tapered fiber optic coupler configured to increase a surface size of a fiber core.

6. The laser-based system of claim 1, wherein the tracking module is further configured to select at least one of the plurality of acquired laser beams as a beacon signal based on at least one of: a reliability of the selected beam, a capacity of the selected beam, spatial characteristics of the selected beam, or temporal characteristics of the selected beam.

7. The laser-based system of claim 1, wherein adjusting the beam divergence comprises covering a region of uncertainty such that $\theta > \alpha \times \sigma_{max}$, wherein $\theta$ comprises an applied beam divergence, $\alpha$ comprises a diffraction limited beam divergence, and $\sigma_{max}$ comprises an uncertainty factor.

8. The laser-based system of claim 1, wherein the adaptive learning unit comprises an adaptive neural network configured to extract a relative location of a beacon at a sub-pixel resolution.

9. A non-transitory computer-readable storage medium comprising computer-readable instructions executable by a processor to perform or control performance of operations comprising:
acquiring and characterizing a plurality of laser beams;
tracking the plurality of acquired laser beams;
controlling a first beam, including adjusting a beam divergence of the first beam in relation to a spatial uncertainty;
detecting a second beam, including:
receiving a command to connect to a node;

checking if a transmitted power is higher than a threshold value;
calculating a position vector relative to the node; and
calculating the spatial uncertainty based on the position vector;
implementing an adaptive learning detection algorithm to identify and track a unique optical signature from at least one of the plurality of acquired laser beams; and
pointing at least one laser beam towards a target based on the plurality of acquired laser beams.

10. A laser-based system for communication, the system comprising a plurality of communication nodes, each node being configured to transmit and receive beacon signals with a transmitted power and each node comprising:
a monostatic optical aperture to receive a plurality of laser beams, to transmit a first beam, and to receive a second beam;
an acquisition module configured to continuously receive beacon signals through second beams from the plurality of other nodes in the system and to acquire and characterize the second beams based on the received beacon signals;
a tracking module configured to track the acquired laser beams, the tracking module comprising:
a beaconing feedback and beam divergence mechanism configured to control the first beam and detect the second beam from a given node of the plurality of other nodes in the system, wherein the beaconing feedback and beam divergence mechanism is configured to:
receive a command to connect to the given node,
determine whether the transmitted power of the first beam is higher than a threshold and, if so, initiate data transfer through the first beam; and
in response to the transmitted power being below or equal to the threshold:
calculate a position vector relative to the given node;
calculate a spatial uncertainty function based on the calculated position vector; and
control the first beam by adjusting a beam divergence of the first beam to cover a region of uncertainty which is defined based on the spatial uncertainty function, such that $\theta > \alpha \times \sigma_{max}$, where $\theta$ represents an applied beam divergence, $\alpha$ represents a diffraction limited beam divergence and $\sigma_{max}$ represents an uncertainty factor; and
a pointing module configured to point the first beam towards a target based on the acquired laser beams.

11. The system of claim 10, wherein the tracking module comprises a site diversity unit configured to select at least one of the acquired laser beams based on at least one of: a reliability of the beam, a capacity of the beam, spatial characteristics of the beam and/or temporal characteristics of the beam.

12. The system of claim 10, wherein the acquisition module comprises:
a fiber optic coupling mechanism to couple the acquired laser beams to a fiber system; and
a laser beam characterization unit configured to extract specific information from the at least one of the acquired laser beams.

13. The system of claim 12, wherein the laser beam characterization unit comprises an interferometric and compute system configured to extract the specific information.

14. The system of claim 12, wherein the specific information comprises at least one of a temporal identifier, a spatial identifier and/or a spectral identifier.

15. The system of claim 12, wherein the fiber optic coupling mechanism comprises a tapered fiber optic coupler configured to increase a surface size of a fiber core.

16. The system of claim 10, wherein the pointing module comprises a multi-stage beam steering unit configured to steer at least one laser beam towards a target based on the acquired laser beams.

17. The system of claim 10, further comprising a neural network configured to:
identify and track a unique optical signature from at least one of the acquired laser beams; and
extract a relative location of a beacon at a sub-pixel resolution.

18. The system of claim 10, wherein the pointing module comprises a multi-stage beam steering unit induced by a diffraction grating caused by at least one of an acoustic wave and/or a holographic material.

19. A method for communication by a laser-based system comprising a plurality of communication nodes, each node transmitting and receiving beacon signals with a transmitted power, the method comprising at each node:
continuously receiving beacon signals through second beams from the plurality of other nodes and, based on the received beacon signals, acquiring and characterizing, by an acquisition module of a laser-based system having a monostatic optical aperture, a plurality of second beams received through the monostatic optical aperture;
tracking, by a tracking module, the acquired laser beams, the tracking comprising:
receiving a command to connect to a given node of the plurality of other nodes,
determining whether the transmitted power of a first beam transmitted through the monostatic optical aperture is higher than a threshold and, if so, initiating data transfer with the given node through the first beam;
in response to the transmitted power being below or equal to the threshold:
calculating a position vector relative to the given node;
calculating a spatial uncertainty function based on the calculated position vector; and
controlling the first beam by the beaconing feedback and beam divergence mechanism, wherein controlling the first beam comprises adjusting a beam divergence of the first beam to cover a region of uncertainty which is defined based on the spatial uncertainty function, such that that $\theta > \alpha \times \sigma_{max}$, where $\theta$ represents an applied beam divergence, $\alpha$ represents a diffraction limited beam divergence and $\sigma_{max}$ represents an uncertainty factor; and
pointing, by a pointing module, the first beam towards a target based on the acquired laser beams.

20. A non-transitory computer-readable storage medium comprising computer-readable instructions executable by a processor to perform or control performance of operations comprising in a laser-based system comprising a plurality of communication nodes, each node transmitting and receiving beacon signals with a transmitted power, the operations comprising at each node:
continuously receiving beacon signals through second beams from the plurality of other nodes and, based on the received beacon signals, acquiring and characterizing, by an acquisition module of a laser-based system having a monostatic optical aperture, a plurality of second beams received through the monostatic optical aperture;

tracking, by a tracking module, the acquired laser beams, the tracking comprising:

receiving a command to connect to a given node of the plurality of other nodes, determining whether the transmitted power of a first beam transmitted through the monostatic optical aperture is higher than a threshold and, if so, initiating data transfer with the given node through the first beam;

in response to the transmitted power being below or equal to the threshold:

calculating a position vector relative to the given node;

calculating a spatial uncertainty function based on the calculated position vector; and controlling the first beam by the beaconing feedback and beam divergence mechanism, wherein controlling the first beam comprises adjusting a beam divergence of the first beam to cover a region of uncertainty which is defined based on the spatial uncertainty function, such that that $\theta > \alpha \times \sigma_{max}$ where $\theta$ represents an applied beam divergence, $\alpha$ represents a diffraction limited beam divergence and $\sigma_{max}$ represents an uncertainty factor; and pointing, by a pointing module, the first beam towards a target based on the acquired laser beams.

\* \* \* \* \*